United States Patent
Moon et al.

(10) Patent No.: US 10,798,115 B2
(45) Date of Patent: Oct. 6, 2020

(54) APPARATUS AND METHOD FOR DETECTING MALICIOUS DEVICE BASED ON SWARM INTELLIGENCE

(71) Applicant: ELECTRONICS AND TELECOMMUNICATIONS RESEARCH INSTITUTE, Daejeon (KR)

(72) Inventors: Yong-Hyuk Moon, Daejeon (KR); Dae-Won Kim, Daejeon (KR); Young-Sae Kim, Daejeon (KR); Seung-Yong Yoon, Daejeon (KR); Jin-Hee Han, Daejeon (KR); Jae-Deok Lim, Sejong (KR); Jeong-Nyeo Kim, Daejeon (KR); Yong-Sung Jeon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 303 days.

(21) Appl. No.: 15/920,114

(22) Filed: Mar. 13, 2018

(65) Prior Publication Data

US 2018/0343275 A1    Nov. 29, 2018

(30) Foreign Application Priority Data

May 29, 2017  (KR) .................... 10-2017-0065997

(51) Int. Cl.
*H04L 29/06* (2006.01)
*G06F 21/55* (2013.01)

(52) U.S. Cl.
CPC ........ *H04L 63/1425* (2013.01); *G06F 21/552* (2013.01); *G06F 21/554* (2013.01); *H04L 63/20* (2013.01)

(58) Field of Classification Search
CPC .......................... H04L 63/1425; G06F 21/552
See application file for complete search history.

(56) References Cited

U.S. PATENT DOCUMENTS 7,382,731 B1 * 6/2008 Zhao ...................... H04L 12/66
                                                                  370/236
7,813,326 B1 * 10/2010 Kelm ...................... H04L 45/08
                                                                  370/338

(Continued)

FOREIGN PATENT DOCUMENTS

KR    10-2014-0105500 A    9/2014
KR       10-1470942 B1    12/2014

(Continued)

*Primary Examiner* — Jason Chiang

(57) ABSTRACT

Disclosed herein are an apparatus and method for detecting a malicious device based on swarm intelligence. The method includes detecting a malicious device by causing at least one exploration ant to access a device swarm along movement routes in which pheromone trail values are taken into consideration, wherein the exploration ant is generated in response to a detection request received from a security management server, when the at least one exploration ant detects a suspicious device that is suspected to be a malicious device, causing the exploration ant to return along the movement routes in reverse order, and returning pheromone trail values generated by devices on the return movement routes to a malicious device detection apparatus, and identifying whether the suspicious device is the malicious device by calculating an optimal solution based on a local information set generated by aggregating the pheromone trail values returned for movement routes.

18 Claims, 16 Drawing Sheets

(56) References Cited

U.S. PATENT DOCUMENTS

| | | | | |
|---|---|---|---|---|
| 7,957,355 | B1* | 6/2011 | Heiferling | H04W 40/12 |
| | | | | 370/338 |
| 9,092,616 | B2 | 7/2015 | Kumar et al. | |
| 9,729,562 | B2 | 8/2017 | Sonnenberg et al. | |
| 2003/0142851 | A1* | 7/2003 | Brueckner | B25J 9/1617 |
| | | | | 382/107 |
| 2003/0202479 | A1* | 10/2003 | Huang | H04L 43/00 |
| | | | | 370/252 |
| 2008/0162723 | A1* | 7/2008 | Zhao | H04L 12/66 |
| | | | | 709/242 |
| 2012/0317197 | A1* | 12/2012 | De Foy | H04L 67/1063 |
| | | | | 709/204 |
| 2013/0031625 | A1 | 1/2013 | Lim | |
| 2013/0117852 | A1* | 5/2013 | Stute | G06F 21/55 |
| | | | | 726/23 |
| 2013/0123981 | A1 | 5/2013 | Lee et al. | |
| 2014/0133353 | A1* | 5/2014 | Jung | H04L 45/08 |
| | | | | 370/254 |
| 2014/0173709 | A1 | 6/2014 | Eldar et al. | |
| 2016/0234332 | A1* | 8/2016 | Choi | H04L 67/2842 |
| 2016/0261615 | A1* | 9/2016 | Sonnenberg | H04L 45/22 |
| 2017/0147722 | A1* | 5/2017 | Greenwood | G06F 30/20 |
| 2018/0249371 | A1* | 8/2018 | Lim | H04W 28/065 |
| 2019/0260802 | A1* | 8/2019 | Kerseboom | H04B 3/54 |

FOREIGN PATENT DOCUMENTS

| | | |
|---|---|---|
| KR | 10-2015-0006042 A | 1/2015 |
| KR | 10-2016-0106505 A | 9/2016 |

* cited by examiner

END NODE

| | 1 | 2 | 3 | 4 | 5 | 6 | 7 | 8 | 9 |
|---|---|---|---|---|---|---|---|---|---|
| START NODE 1 | X | 5 | - | - | - | - | - | - | - |
| 2 | 1 | X | 1 | - | 3 | - | - | - | - |
| 3 | - | 2 | X | - | - | 0 | - | - | - |
| 4 | 0 | - | - | X | 3.5 | - | 2 | - | - |
| 5 | - | 2 | - | 1 | X | 4 | - | 1 | - |
| 6 | - | - | - | - | 0 | X | - | - | - |
| 7 | - | - | - | 1 | - | - | X | 1 | - |
| 8 | - | - | - | - | 1 | - | 2 | X | 2.5 |
| 9 | - | - | - | - | - | 2.5 | - | 1 | X |

FIG. 7

APPARATUS AND METHOD FOR DETECTING MALICIOUS DEVICE BASED ON SWARM INTELLIGENCE

CROSS REFERENCE TO RELATED APPLICATION

This application claims the benefit of Korean Patent Application No. 10-2017-0065997, filed May 29, 2017, which is hereby incorporated by reference in its entirety into this application.

BACKGROUND OF THE INVENTION

1. Technical Field

The present invention relates generally to technology for evaluating security-related system faults in embedded, mobile, and Internet-of-Things (IoT) devices, and more particularly to technology for detecting security faults in device systems which are distributed and operated on a large scale.

2. Description of the Related Art

Recently, with a rapid increase in the number of mobile devices and the expansion of services provided by Internet-of-Things (IoT) devices, a variety of types of devices have been arranged in a broader environment. Further, the type and complexity of device-based application services are rapidly increasing.

Since most such devices are connected to a network, a security function for data communication transactions is very important. However, a complicated encryption function is characterized in that a lot of computing power and resources are required. Further, most devices hold one or more cryptographic private keys so as to store and process confidential information, and these keys are typically implemented to be processed in a specific component.

In order to guarantee technologically highest security, a component for storing confidential information and processing cryptographic private keys must be operated based on a hardware chip. However, due to an increase in cost required for the design and installation of hardware security elements, this technology cannot be a solution suitable for embedded, mobile or IoT devices characterized by limited resources. Further, a modification in system software (e.g. a hardware driver, a library, and an operating system) attributable to the addition of hardware may also act as an obstacle to evaluating the security of hardware-based devices. For example, once security policies are applied to hardware, it is difficult to subsequently change the security policies, thus making it difficult to meet the requirements of various application services. In another example, a hardware chip, such as a Mobile Trusted Module (MTM), has passive operating characteristics of being operated in response only to the request of a related software process, and thus it has structural vulnerabilities of making it impossible to directly detect the occurrence of faults in device systems or to respond to such faults.

As an alternative technique against those limitations, remote attestation technology for checking the security status of a system using a trusted external server may be operated. Multiple transactions that may be caused by remote attestation to verify the security status of each individual device (e.g. integrity or reliability) cause excessively complicated software activity. This contributes to an increase in the complexity of system operation. However, requirements for extensive computing resources and storage space and high battery power consumption are considered to be factors that greatly hinder the possibility of introducing remote attestation technology.

Meanwhile, some conventional technologies for evaluating the security of devices perform a procedure for generating checksum values by traversing code memory, and allowing a trusted entity to determine whether the checksum values are accurate. However, since recent malware uses various types of attack methods, simple code memory verification-centered techniques have obvious limitations in detecting device system damage. For instance, these techniques cannot respond to code execution attacks on data memory, such as a stack and a heap, and Return-oriented Programming (RoP) attacks, which execute desired pieces of code in order to cause malicious behavior by forging a program control flow through the random change of the return address of a function or by forging instructions related to return, call, branch, and jump instructions.

Meanwhile, device verification schemes depending on a hash function such as SHA256 or MD5 are technically meaningful only given the assumption that a trusted entity, such as a remote server, has a reference integrity measures (RIMs) database (DB) for all devices. That is, in order to verify hash values measured from an arbitrary device composed of a specific operating system, a network stack, a library, and processes, the remote server must contain all of the above-described information related to the arbitrary device and must be able to calculate hash values using the same method as the arbitrary device. Considering the current situation in which devices are operated by various operating systems and software configurations, schemes for verifying individual devices based on RIMs definitely have limitations.

Furthermore, it is difficult for a structure in which a central trusted server verifies large-scale device swarms to structurally respond to an increase in the scale of device swarms. For example, IoT devices have recently started to be used for the construction of botnets. As a representative thereof, the Mirai botnet executed a Distributed Denial-of-Service (DDoS) attack on a U.S. Domain Name Server (DNS), thus paralyzing the Internet.

The present invention proposes an apparatus and method for detecting a malicious device based on swarm intelligence to overcome structural vulnerabilities and technical limitations in the above-described device remote attestation.

Meanwhile, Korean Patent No. 10-1470942 discloses technology entitled "Method and Device for Optimizing Phase of Compliant Mechanism Using Modified Ant Colony Optimization". This technology discloses a phase optimization method and apparatus for a compliant mechanism, which enable a solution to be more rapidly converged when searching for a solution using a Modified Ant Colony Optimization (MACO) algorithm based on Element Contribution Significance (ECS), and which separates individual elements in a design area into structural parts and non-structural parts, thus decreasing the time required for phase optimization calculation.

SUMMARY OF THE INVENTION

Accordingly, the present invention has been made keeping in mind the above problems occurring in the prior art, and an object of the present invention is to overcome the limitation of a conventional device security evaluation technique that determines only whether a device is normal or damaged.

Another object of the present invention is to greatly reduce overhead caused by the generation of global information, updating, and management.

A further object of the present invention is to make a similar optimal solution decision very close to a global solution decision that can be made when global information is acquired.

Yet another object of the present invention is to effectively search devices falling within a very wide range for a malicious device by making relatively little effort, unlike a conventional technique.

Still another object of the present invention is to provide a structural advantage by distributing decision-making structures when searching for a malicious device.

In accordance with an aspect of the present invention to accomplish the above objects, there is provided a method for detecting a malicious device based on swarm intelligence, the method being performed using an apparatus for detecting a malicious device based on swarm intelligence, the method including detecting a malicious device by causing at least one exploration ant to access a device swarm along movement routes in which pheromone trail values are taken into consideration, wherein the at least one exploration ant is generated in response to a detection request received from a security management server; when the at least one exploration ant detects a suspicious device that is suspected to be a malicious device, causing the exploration ant to return along the movement routes in reverse order, and returning pheromone trail values generated by devices on the return movement routes to the malicious device detection apparatus; and identifying whether the suspicious device is the malicious device by calculating an optimal solution based on a local information set that is generated by aggregating the pheromone trail values returned for respective movement routes.

Detecting the malicious device may be configured to request a status check from each device in the device swarm accessed by the at least one exploration ant and acquire detection information from the device.

Detecting the malicious device may be configured to detect the malicious device by allocating at least one of one or more exploration ants, generated for respective types of exploration ants, to the device swarm.

The types of exploration ants may be classified for respective pheromone update weights that are determined depending on system check functions and check purposes of devices in the device swarm.

Detecting the malicious device may be configured to generate pheromone trail values for the movement routes using the pheromone update weights determined depending on the types of the exploration ants.

Detecting the malicious device may be configured to allow the exploration ant to primarily select a movement route having a higher pheromone trail value.

Detecting the malicious device may be configured to stochastically select movement routes using route selection probability information in which route selection probabilities are in proportion to the pheromone trail values.

The route selection probability information may be configured such that route selection probabilities are in inverse proportion to lengths of the movement routes.

The route selection probability information may be configured such that, when a pheromone trail value is not present for a movement route selectable by the exploration ant, a total route selection probability is equally divided by a number of selectable movement routes into route selection probabilities for respective movement routes.

Detecting the malicious device may be configured to decrease a pheromone trail value for a movement route, unselected by the exploration ant, over time at a predetermined evaporation rate.

Returning the pheromone trail values may be configured to cause the exploration ant to return along the movement routes in reverse order and to increase pheromone trail values for the return movement routes.

Returning the pheromone trail values may be configured to generate exploration ants and detect the malicious device until at least one of a search time during which the malicious device is detected, a number of exploration ants that are generated, and a number of suspicious devices that are discovered satisfies a preset detection stop condition.

Identifying whether the suspicious device is the malicious device may be configured to perform network isolation of blocking communication with the malicious device and to perform a memory integrity check on the malicious device.

Identifying whether the suspicious device is the malicious device may be configured to update at least one of an operating system and firmware of the malicious device when a result of the memory integrity check on the malicious device indicates abnormality.

Identifying whether the suspicious device is the malicious device may be configured to execute a security patch command for the malicious device when a result of the memory integrity check on the malicious device indicates normality.

In accordance with another aspect of the present invention to accomplish the above objects, there is provided an apparatus for detecting a malicious device based on swarm intelligence, including an exploration ant distribution unit for detecting a malicious device by causing at least one exploration ant to access a device swarm along movement routes in which pheromone trail values are taken into consideration, wherein the at least one exploration ant is generated in response to a detection request received from a security management server; a pheromone analysis unit for, when the at least one exploration ant detects a suspicious device that is suspected to be a malicious device, causing the exploration ant to return along the movement routes in reverse order, and generating a local information set by aggregating pheromone trail values collected from devices on the return movement routes; and a device control unit for identifying whether the suspicious device is the malicious device by calculating an optimal solution based on the local information set.

The exploration ant distribution unit may request a status check from each device in the device swarm accessed by the at least one exploration ant and acquire detection information from the device.

The exploration ant distribution unit may detect the malicious device by allocating at least one of one or more exploration ants, generated for respective types of exploration ants, to the device swarm.

The exploration ant may stochastically select the movement route using route selection probability information in which route selection probabilities are in proportion to the pheromone trail values.

The exploration ant distribution unit may generate the exploration ants and then detects the malicious device until at least one of a search time during which the malicious device is detected, a number of exploration ants that are generated, and a number of suspicious devices that are discovered satisfies a preset detection stop condition.

The device control unit may perform network isolation of blocking communication with the malicious device and performs a memory integrity check on the malicious device.

BRIEF DESCRIPTION OF THE DRAWINGS

The above and other objects, features and advantages of the present invention will be more clearly understood from the following detailed description taken in conjunction with the accompanying drawings, in which:

FIG. 7 is a diagram illustrating a local information set for nodes in a device swarm;

DESCRIPTION OF THE PREFERRED EMBODIMENTS

Figure 1:
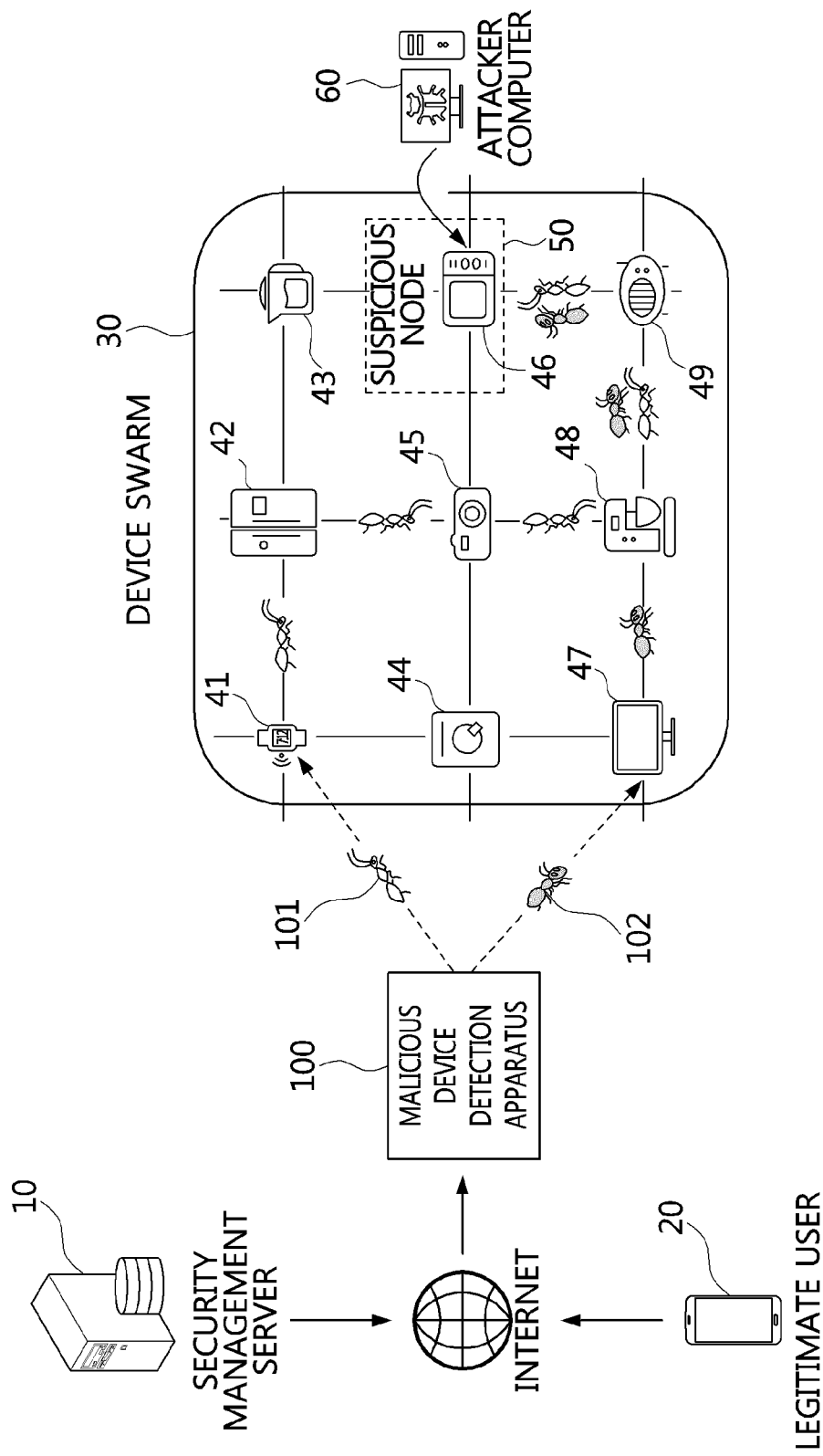
FIG. 1 is a diagram illustrating the configuration of a system for detecting a malicious device based on swarm intelligence according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

The present invention is based on a technical model that effectively collects local information observed in a large-scale device swarm and that is capable of making a determination very close to an optimal decision that can be made when all global information is acquired without violating constraints (e.g. time and computing resources), based on a meta-heuristic technique created by adopting, as an algorithm model for performing optimal decision-making, the peculiarity of unique communication and decision-making structures between individual entities observed from swarm organisms (e.g. ants, bees, moths, etc.) existing in the natural world.

More specifically, the present invention is intended to propose a structure and a technique for identifying the most potent device, suspected to have security-related faults in a large-scale device smarm, through an entity called "exploration ant", which will be described later, from the understanding of an Ant Colony Optimization (ACO) technique, among swarm intelligence algorithms developed based on the above technical spirit, e.g. ACO, Particle Swarm Optimization (PSO), Artificial Bee Colony (ABC), Stochastic Diffusion Search (SDS), and Bacteria Foraging (BF) algorithms.

Hereinafter, preferred embodiments of the present invention will be described in detail with reference to the attached drawings.

FIG. 1 is a diagram illustrating the configuration of a system for detecting a malicious device based on swarm intelligence according to an embodiment of the present invention.

In the embodiment of FIG. 1, for a better understanding of the present invention, the structure of the present invention will be described using ACO among the swarm intelligence algorithms. Therefore, the present embodiment is neither dependent on nor limited to a specific algorithm, and other algorithms in the above-described technical spirit may also be easily applied to the present embodiment.

In accordance with an embodiment of the present invention, a device connected to a network route (path) illustrated in the drawings may be particularly referred to as a "node".

Referring to FIG. 1, it can be seen that the configuration of the system for detecting a malicious device based on swarm intelligence according to the embodiment of the present invention includes a security management server 10, a user terminal device 20, a malicious device detection apparatus 100, a device swarm 30, and individual devices 40 ranging from 41 to 49.

It can be seen that the malicious device detection apparatus 100 generates exploration ants 101 and 102.

The device swarm 30 may include individual devices 41 to 49.

Here, at least one of the individual devices 40 (41 to 49) may be attacked by an attacker computer 60 and may then be changed to a malicious device (or a suspicious device) 50, which performs a malicious function.

The system of FIG. 1 may be a structure in which the distributed individual devices 41 to 49 allow the security management server 10 to acquire global information about a specific device swarm 30, based on local information that can be checked at a specific time or upon the occurrence of an event or that is pre-stored.

Here, the local information means fragmentary system status information of the individual devices 41 to 49, acquired by one exploration ant while the exploration ant randomly, iteratively perform a route search (or route finding). Conversely, the global information may be defined as all system status information of all devices included in the device swarm 30. The method for defining and acquiring local information will be described in detail later with reference to the following drawings.

The security management server 10 may be a trusted central entity, and may be disposed outside the device swarm 30. Here, the security management server 10 may perform functions, such as authentication and registration for the individual devices 41 to 49 belonging to the device swarm 30, the selection of a suspicious device from among the individual devices 41 to 49, and the control of a response to the suspicious device.

The malicious device detection apparatus 100 may be a swarm gateway device.

That is, the malicious device detection apparatus 100 may perform the detection of a malicious device according to the embodiment of the present invention while performing the function of a normal gateway device.

The security management server 10 may be made aware, in advance, of information about the device swarm 30, covered by the malicious device detection apparatus 100, over the Internet. For example, the information about the device swarm may include a topology, an identifier, a location, etc. The security management server 10 may have a structure for transmitting functions desired to be performed to the individual devices 41 to 49 belonging to the device swarm 30 through the malicious device detection apparatus 100.

Further, the security management server 10 may receive local information about suspicious devices, the system status of which is not normal, from the malicious device detection apparatus 100, and may then select the most suspicious device by aggregating the local information. Meanwhile, the security management server 10 may use a response control means, such as device re-authentication, device isolation, and forced update of a device operating system, for the most suspicious device.

The Internet may be a Transmission Control Protocol/Internet Protocol (TCP/IP)-based Internet environment. In the present invention, data communication between the individual devices 41 to 49, between the individual devices 41 to 49 and the malicious device detection apparatus 100, between the malicious device detection apparatus 100 and the security management server 10, between the security management server 10 and the user terminal device 20, and between the user terminal device 20 and the malicious device detection apparatus 100 may be performed over the Internet, based on mutual authentication, secure key exchange, an encrypted session, etc. using conventional security technology. That is, mutual authentication and encrypted communication between individual entities may be concluded using the conventional technology (e.g. Transport Layer Security (TLS), Datagram TLS (DTLS), Protocol for carrying Authentication and Network Access (PANA), etc.), and data communication, for which confidentiality and integrity are guaranteed, may be performed under mutual trust.

The user terminal device 20 may be a normal (legitimate) user device, and may be an authorized user device permitted to access various types of services performed by device 1 41 to device 9 49, that is, the individual devices 40, which will be described in detail later, and to require the performance of a specific function and the calculation of specific data.

The malicious device detection apparatus 100 may function as an entry point for the device swarm 30, and may generate and distribute exploration ants 101 and 102 in response to a command from the security management server 10. The exploration ant 101 may randomly select the device to visit first. According to an embodiment of the present invention, it can be seen that exploration ant 1 is allocated first to the device 1 41 and that exploration ant 2 is allocated first to the device 7 47.

Further, the malicious device detection apparatus 100 may acquire the location information obtained by an arbitrary exploration ant, and may determine whether pieces of local information acquired from a plurality of exploration ants satisfy detection stop conditions. If it is determined that the detection stop conditions are satisfied, the malicious device detection apparatus 100 may transfer all pieces of aggregated local information to the security management server 10.

For the device swarm 30, all of the individual devices 41 to 49, physically or logically included in the same domain depending on a specific area, service, or condition, may be defined as a device swarm. The device swarm 30 may be identified and managed by the malicious device detection apparatus 100. In the embodiment of FIG. 1, it can be seen that there are a total of nine individual devices 41 to 49 are present for effective description of the present invention.

Further, the device swarm 30 is illustrated such that direct communication between devices (device-to-device communication) is possible, but network communication between diagonally located devices, for example, between the device 1 41 and the device 5 45, is not present.

The exploration ant 1 101 and the exploration ant 2 102 may be generated and distributed by the malicious device detection apparatus 100. Each of the exploration ants 101 and 102 may randomly select the next route on a movement route, may request a system check from the device to visit, and may store the result of the system check. The details of a system check required by respective exploration ants may differ from each other. Meanwhile, each exploration ant may stop route searching when an allocated Time-to-Live (TTL) count becomes 0 or when the exploration ant visits a device on which the result of the system check is suspected to be abnormal, and may return to the malicious device detection apparatus 100 in reverse order with respect to the routes selected so far. In another embodiment of the present invention, the exploration ant may be composed of request messages for searching for network routes.

Each of device 1 41 to device 9 49 may be any of an embedded device, a mobile device, and an IoT device which provide typical computation, storage, and communication abilities. That is, the devices 1 41 to 9 49 included in the device swarm 30 may be agent devices installed with agent software that takes exclusive charge of interaction with exploration ants. Also, the agent software may function to check the specific system status required by each exploration ant, and may increase a pheromone trail value for each route between devices in response to a request from the exploration ant based on an equation, which will be described later. Meanwhile, the agent software may decrease a pheromone trail value for a specific route based on an equation, which will be described later, with the lapse of time. A detailed example of the function performed by the agent software will be described in detail with reference to the following drawings.

The malicious device 50 (i.e. device 6 46) may be a device, a specific element of the system of which is determined by one or more exploration ants to exhibit abnormal activity, in the device swarm 30. While randomly visiting neighboring devices through an arbitrary route, the exploration ant may check the specific system status of the visited device, and may record an abnormality for the specific system status if the specific system status is found to be abnormal.

That is, when a device exhibiting unreliable system activity is selected by the exploration ant, the malicious device detection apparatus 100 may recognize that the corresponding device is one of suspicious devices. As suspicious devices, there may be multiple suspicious devices in a single device swarm 30, but in the embodiment of the present invention, it is assumed that a single device is determined to be a suspicious device for convenience of description.

The attacker computer 60 may be a third computing device located outside the device swarm 30, and may perform malicious functions, such as making an attack on system vulnerabilities, the injection of malicious code, an attempt to leak data, and commanding of unauthorized software activity, on unspecified devices belonging to the device swarm 30. As illustrated in FIG. 1, in the present embodiment, it is assumed that the attacker computer applies system forgery, damage, or interruption to the device 6 46.

Further, the configuration of the device network and system illustrated in FIG. 1 is merely one feasible embodiment. Thus, the combined configuration of the device swarm 30, the security management server 10, and the malicious device detection apparatus 100 is not limited to that of FIG. 1, but may be implemented in various embodiments. Furthermore, since the configuration of FIG. 1 is described in brief based on the functions of respective entities which perform principal functions in the present invention for a better understanding of device networks, those skilled in the art related to typical computers, networks, security, and hardware can easily understood the configuration.

Figure 2:
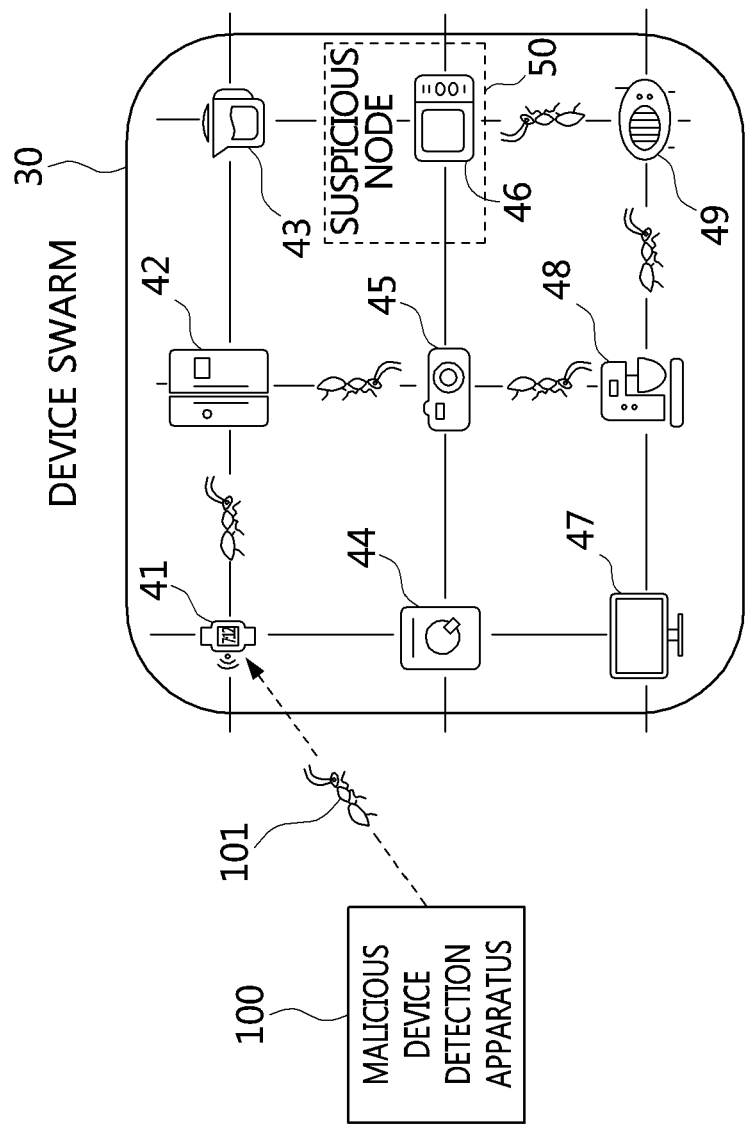
FIG. 2 is a diagram illustrating an example of a route search procedure using the malicious device detection apparatus illustrated in FIG. 1.
Figure 3:
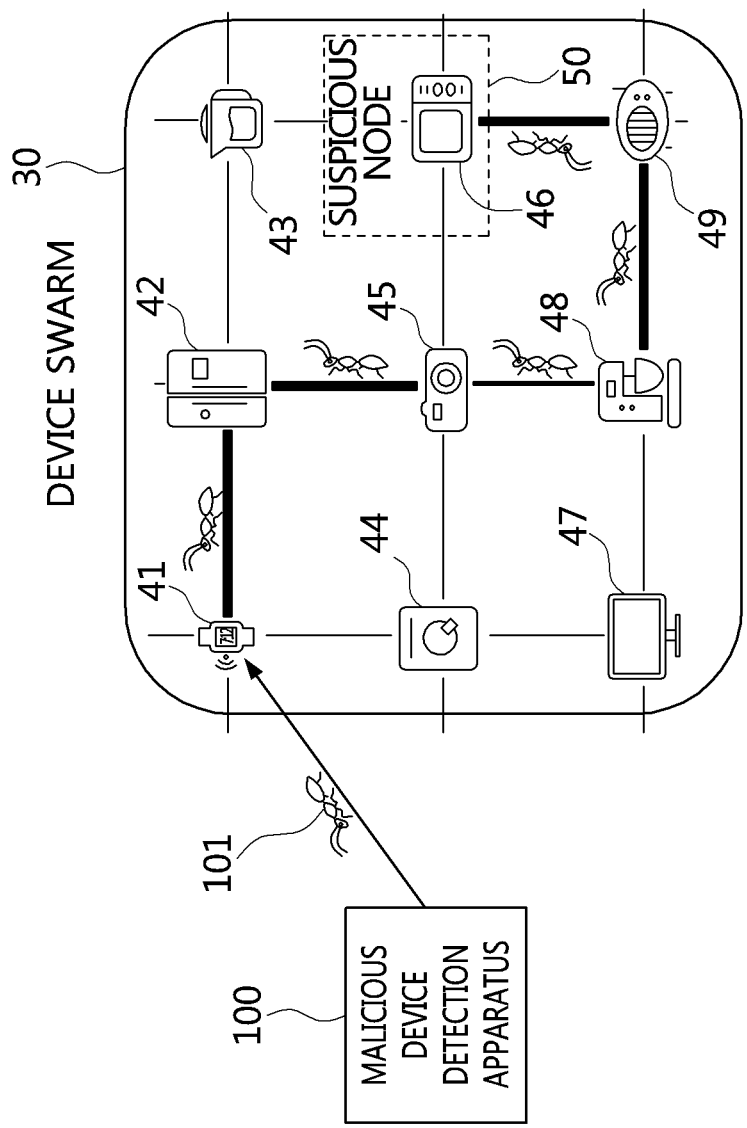
FIGS. 3 to 5 are diagrams illustrating an example of a procedure for detecting an infected device and returning a pheromone trail value using the malicious device detection apparatus illustrated in FIG. 1.
Figure 4:
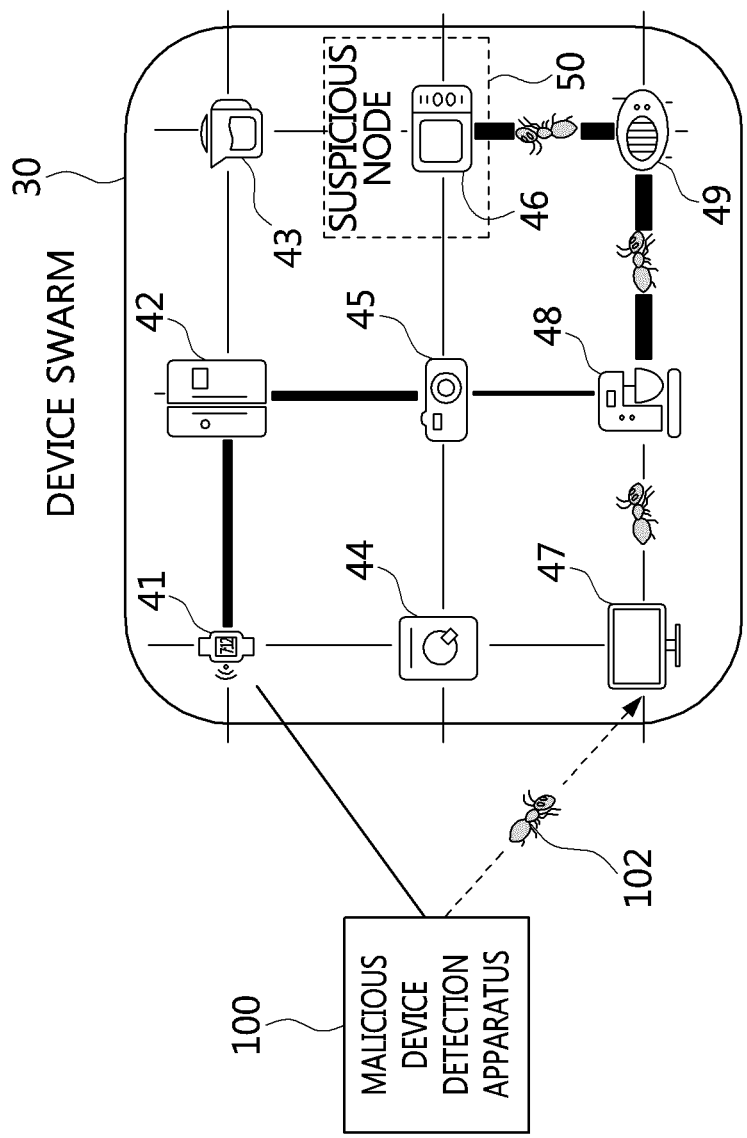
Figure 5:
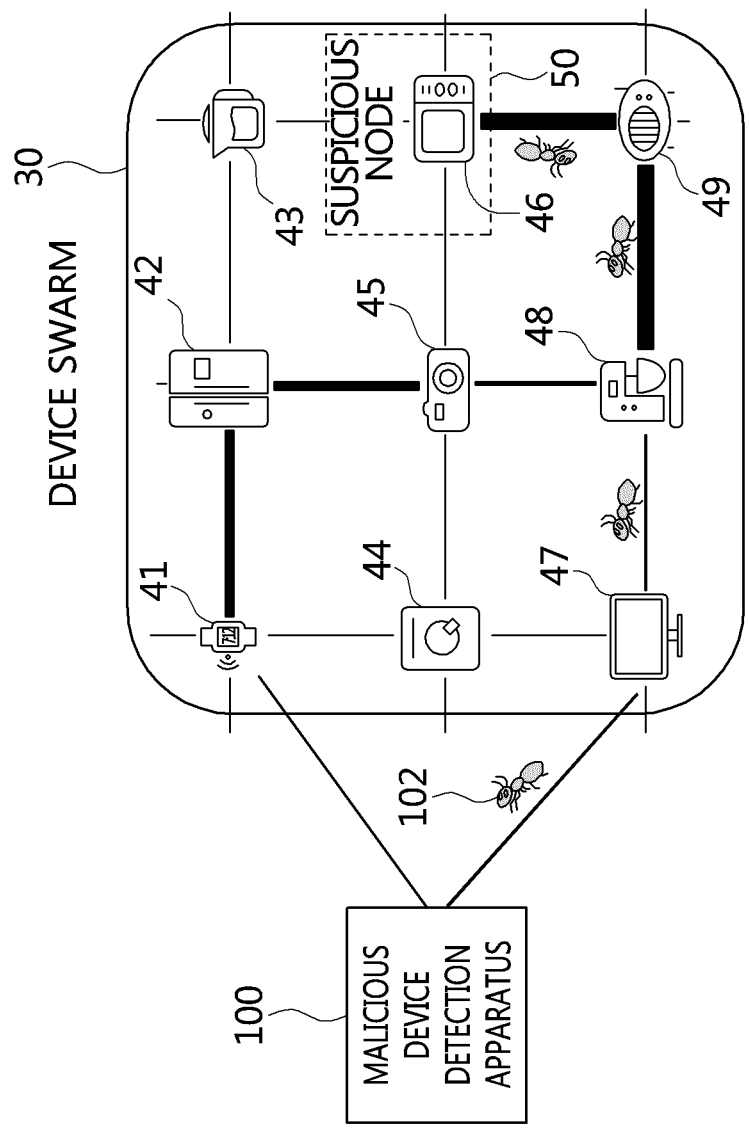
Figure 6:
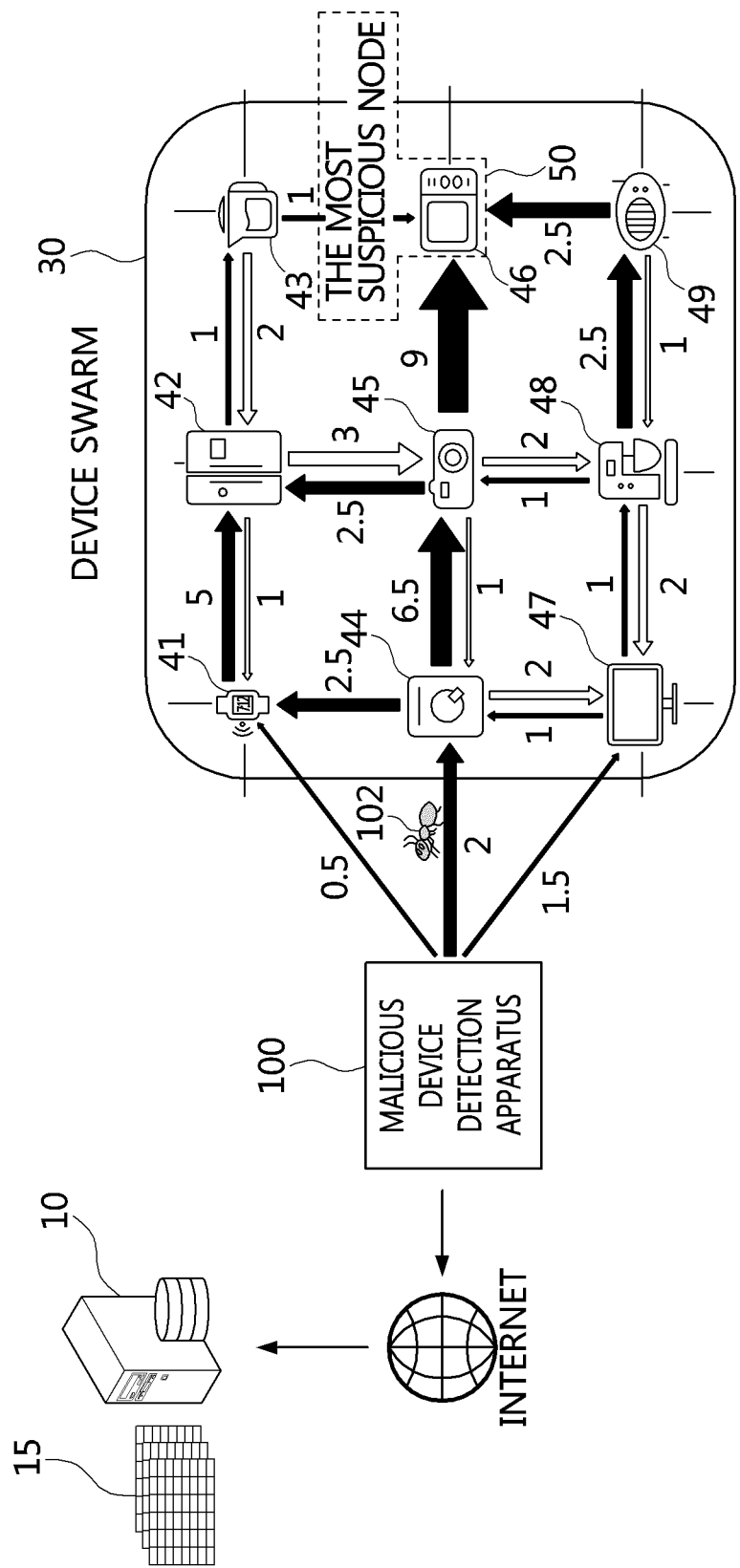
FIG. 6 is a diagram illustrating an optimal solution decision procedure using the malicious device detection apparatus illustrated in FIG. 1.
Figure 8:
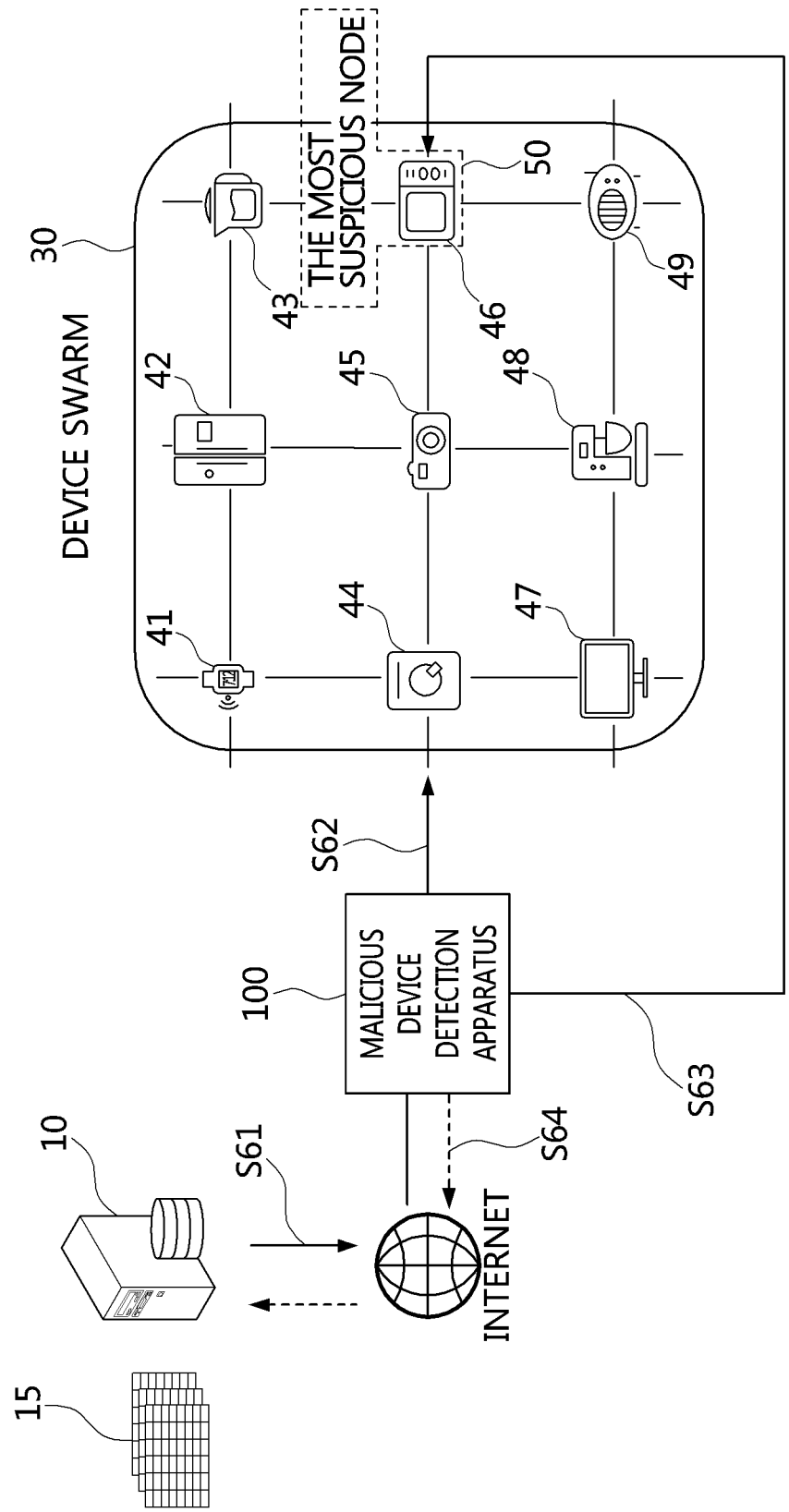
FIG. 8 is a diagram illustrating a procedure in which a security management server responds to a malicious device.

FIG. 2 is a diagram illustrating an example of a route search procedure using the malicious device detection apparatus illustrated in FIG. 1. FIGS. 3 to 5 are diagrams illustrating an example of a procedure for detecting an infected device and returning a pheromone trail value using the malicious device detection apparatus illustrated in FIG. 1. FIG. 6 is a diagram illustrating an optimal solution decision procedure using the malicious device detection apparatus illustrated in FIG. 1. FIG. 7 is a diagram illustrating a local information set for nodes in a device swarm. FIG. 8 is a diagram illustrating a procedure in which a security management server responds to a malicious device.

Referring to FIG. 2, in a route search procedure using the malicious device detection apparatus, the malicious device detection apparatus 100 may generate a single exploration ant 101 and may allocate the same to the device swarm 30. Here, the malicious device detection apparatus 100 may simultaneously distribute multiple exploration ants so as to improve a suspicious device detection speed.

In accordance with an embodiment of the present invention, the device that can be selected as a node to be visited first by the exploration ant (first-visit node) is described as being limited to device 1 41, device 4 44 or device 7 47 in the drawings for convenience of description.

In accordance with an embodiment of the present invention, each route may have directionality. For example, the route between the device 1 41 and the device 2 42 may have two types, namely (1, 2) and (2, 1).

In accordance with an embodiment of the present invention, the exploration ant does not revisit a previously visited route.

In accordance with an embodiment of the present invention, the device 6 46 is assumed to be a suspicious device.

Further, in accordance with an embodiment of the present invention, distances and bandwidths may actually differ between the devices, but, for convenience of description, the differences in distance and bandwidth between the devices are not separately depicted in the drawings.

The malicious device detection apparatus 100 may receive a suspicious node search command from the security management server 10, and may distribute the exploration ant 1 101 that was generated first to the device 1 41. Here, a first-visit node may be randomly selected.

The exploration ant 1 101 may select a movement route to any one of the device 2 42 and the device 4 44. Here, the exploration ant 1 101 may inquire of the agent software of the device 1 41 about pheromone trail values for the two routes. However, since a search was not performed before the exploration ant 1 101 was operated, pheromone trail values for all network routes in the device swarm 30 are 0. Therefore, in this case, the exploration ant 1 may randomly select a movement route. As illustrated in FIG. 2, in accordance with an embodiment of the present invention, it can be seen that the exploration ant 1 101 selects the device 2 42 and then selects the route (1, 2).

Using the same method as the above-described method, the exploration ant 1 101 may randomly select and sequentially move to the device 5 45, the device 8 48, the device 9 49, and the device 6 46. Therefore, the exploration ant 1 101 may be understood to select routes (1, 2), (2, 5), (5, 8), (8, 9), and (9, 6). The exploration ant 1 101 may store route change information whenever visiting each individual device. Further, the exploration anti 101 may request a system check from the agent of each individual device to visit, may ascertain the result of the check, and may store details of abnormality detection if an abnormality is detected in the result.

Referring to FIG. 3, it can be seen that the exploration ant 1 101 has detected a system abnormality in the device 6 46. After detecting the device 6 46 as a malicious device 50, the exploration ant 1 101 may update the pheromone trail values while moving along the routes moved so far in reverse order, that is, in the order (6, 9), (9, 8), (8, 5), (5, 2), and (2, 1). For example, the update of the pheromone trail values is performed in such a way that, when the exploration ant 1 101 arrives at the device 9 49 from the device 6 46 while moving along route (6, 9), the exploration ant 1 101 may request the agent software of the device 9 46 to increase a pheromone trail value corresponding to the original route (9, 6) and store the increased pheromone trail value. Also, the exploration ant 1 101 may store the updated pheromone trail value for the route (9, 6).

Here, the exploration ant 1 101 may iteratively perform the above-described procedure until it returns to the device 1 41 in reverse order. Accordingly, updated pheromone trail values corresponding to all movement routes along which the exploration ant 1 101 has moved, that is, the routes (1, 2), (2, 5), (5, 8), (8, 9), and (9, 6), may be stored in the device 1 41, device 2 42, device 5 45, device 8 48, and device 9 49, respectively, and the exploration ant 1 101 may store the updated pheromone trail values for all of the movement routes. Finally, the exploration ant 1 101, having returned to the malicious device detection apparatus 100, may deliver information about the routes along which the exploration ant 1 101 has moved and updated values of the pheromone trail values for the movement routes, and may terminate its duty.

The order of the return routes of the exploration ant may be the reverse order with respect to the movement routes. It can be seen that, in FIG. 3, the return routes are indicated by bold lines for a better understanding of the present invention. Further, the routes for which pheromone trail values are increased are indicated by bolder lines. For each route, the amount of update of the pheromone trail value may be increased at different rates.

As described above with reference to FIG. 3, it can be seen from FIGS. 4 to 6 that the higher the pheromone trail value corresponding to a route, the bolder the line indicating the route.

Referring to FIG. 4, the malicious device detection apparatus 100 may be specialized to function as an entry point of the device swarm 30, covered thereby.

Therefore, when selecting a first device for entering the device swarm 30, the exploration ant 2 102 may randomly select a device without using pheromone trail values as weights. The reason for this is that the negative effect of converging on a local optimal solution may be prevented only when the malicious device detection apparatus 100 distributes exploration ants to a variety of types of devices. Here, the term "optimal solution" may be the solution (the most suspicious device) finally derived by the apparatus and method for detecting a malicious device based on swarm intelligence proposed in the present invention. Further, the term "local optimal solution" may be the most suspicious device that is derived based on limited information about some devices and some routes belonging to the device swarm 30. For reference, the term "global optimal solution" may be an optimal solution that can be derived when information about all devices and all routes belonging to the device swarm 30 is given.

Based on the above-described principle, the exploration ant 2 102 may be randomly allocated to any of the device 1 41, the device 4 44, and the device 7 47 by the malicious device detection apparatus 100. It can be seen from FIG. 4 that the exploration ant 2 102 is allocated first to the device 7 47. At this time, the exploration ant 2 may request a system check for the device 7 47 from the agent software of the device 7 47, and may ascertain the result of the system check. In an embodiment of the present invention, the device 7 47 is assumed to be normal in a system list verified by the exploration ant 2 102. In this case, the exploration ant 2 102 may select any one of the device 4 44 and the device 8 48 for a subsequent route search. In an embodiment of the present invention, the exploration ant 2 102 may randomly select route (7, 8) of two routes and then move to the device 8. Next, the exploration ant 2 102 may select any one of the device 5 45 and the device 9 49 as the next device to visit. Here, in route (8, 9), the pheromone trail value left by the exploration ant 1 101 may be delivered to the exploration ant 2 102 through the agent of the device 8 48. Further, the exploration ant 2 102 may recognize a pheromone trail value for route (8, 5) using the same method. In an embodiment of the present invention, since the pheromone trail value for route (8, 5) is less than that of route (8, 9) to the device 9 49, the exploration ant 2 may stochastically select route (8, 9). That is, when the route is selected, each pheromone trail value may act as a weight for increasing the probability of route selection.

The exploration ant 2 102 may check the system status of the device 9 49, and may ascertain that the system status is normal. Based on the above-described method, the exploration ant 2 102 may stochastically select the device 6 46 as the next device to visit, and may ascertain that a system abnormality is present in the device 6 46. In accordance with an embodiment of the present invention, system items checked by the exploration ant 1 101 and the exploration ant 2 102 may be different from each other.

Referring to FIG. 5, the exploration ant 2 102 may perform the same procedure as the procedure, described above with reference to FIG. 3, in which the exploration ant 1 101 returns to the malicious device detection apparatus 100. However, since the entire movement route of the exploration ant 2 102 follows the order (7, 8), (8, 9), and (9, 6), it can be seen that the exploration ant 2 102 is moved in reverse order with respect to the movement order, that is, the order (6, 9), (9, 8), and (8, 7). Here, the exploration ant 2 102 may update respective pheromone trail values by adding a pheromone trail value for route (9, 6) to the device 9 49, adding a pheromone trail value for route (8, 9) to the device 8 48, and adding a pheromone trail value for route (7, 8) to the device 7 47.

Finally, the exploration ant 2 102, having returned to the malicious device detection apparatus 100, may report all movement routes and updated pheromone trail values for respective routes, and may terminate its duty.

Referring to FIG. 6, in accordance with an embodiment of the present invention, detection stop conditions may be designated as the total number of exploration ants allocated to the device swarm 30, for convenience of description. In detail, when the total number of exploration ants that are allocated reaches a positive integer N, the malicious device detection apparatus 100 may stop generating and allocating additional exploration ants.

When the exploration ant N returns, the malicious device detection apparatus 100 may acquire a total of N local information sets 15 for the device swarm 30. The local information sets 15 may be visualized, as indicated in the device swarm 30. As illustrated in FIG. 6, the pheromone trail value for route (1, 2) is indicated by a black arrow pointing to the right, and the detailed value thereof is indicated as 5. In another example, the pheromone trail value for route (5, 8) is indicated by a white arrow pointing downwards.

In accordance with an embodiment of the present invention, the selection made from the malicious device detection apparatus 100 to the first-visit device of the exploration ant (e.g. one of device 1 41, device 4 44, and device 7 47) may be randomly performed, as described above with reference to FIGS. 2 to 4.

However, the malicious device detection apparatus 100 may incorporate the number of times the device 1 41, the device 4 44, or the device 7 47 is selected as the first-visit device into the corresponding pheromone trail value.

That is, the malicious device detection apparatus 100 may increase a pheromone trail value for a route to a device that is frequently selected as the first-visit device.

Further, the malicious device detection apparatus 100 may decrease a pheromone trail value for a route to a device that is unselected as the first-visit device.

Therefore, in FIG. 6, a route between the malicious device detection apparatus 100 and the first-visit device may also be marked in the same form (e.g. the thickness of a line, the directionality of the line, and a pheromone trail value) as the route between other devices belonging to the device swarm.

In accordance with an embodiment of the present invention, pheromone trail values may not be present in all network routes. The first reason for this is that there may be routes along which N exploration ants absolutely do not pass. The second reason is that a network route between devices may not be physically or logically present. Further, there may be the case where, since pheromone trail values for all routes may be decreased at different rates with the lapse of time, a pheromone trail value becomes "0" when completely decreased, and thus an arrow may not be indicated, even for a movement route.

As illustrated in FIG. 6, the exploration ant may depart from any one of the device 1, device 4, and device 7, which may be a first-visit device in the device swarm 30, and may move along routes based on the highest pheromone trail value. Here, the exploration ant may determine that the highest pheromone trail values are incorporated into routes (4, 5) and (5, 6), and that the final device to meet when moving along the corresponding route is the device 6 46. Therefore, by way of the above method, the device 6 46 may be selected as the most suspicious device (global optimal solution) 50.

Referring to FIG. 7, it can be seen that the security management server 10 represents a local information set 15 obtained by aggregating pieces of local information for the device swarm 30. Here, mark "X" means that a network route cannot be formed using only a single node. Further, symbol "-" means that there is no network route between two nodes. Mark "O" means that there is a network route between two nodes, but a pheromone trail value is not present for the network route. For example, it can be seen that a pheromone trail value for route (1, 2) is 5. Numbers from 1 to 9 arranged on the left side of the drawing denote route start nodes. Further, numbers from 1 to 9 arranged on the upper portion of the drawing denote route end nodes.

Referring to FIG. 8, the security management server 10 may deliver a response command for the most suspicious device 50 to the malicious device detection apparatus 100 over the Internet at step S61.

Further, the malicious device detection apparatus 100 may isolate the malicious device 50 from the network by executing the received command on the device swarm 30 (i.e. broadcasting for node isolation) at step S62. At step S62, external communication through the malicious device detection apparatus 100 may also be blocked.

When a second response command is received from the security management server 10, the malicious device detection apparatus 100 may normalize a device system by forcibly updating the operating system (OS) or firmware of the malicious device 50 with a security patch version (i.e. updating OS/firmware) at step S63.

Next, the normalized device 6 46 may request re-authentication from the security management server 10 through the malicious device detection apparatus 100 (i.e. request re-authentication) at step S64.

Figure 9:
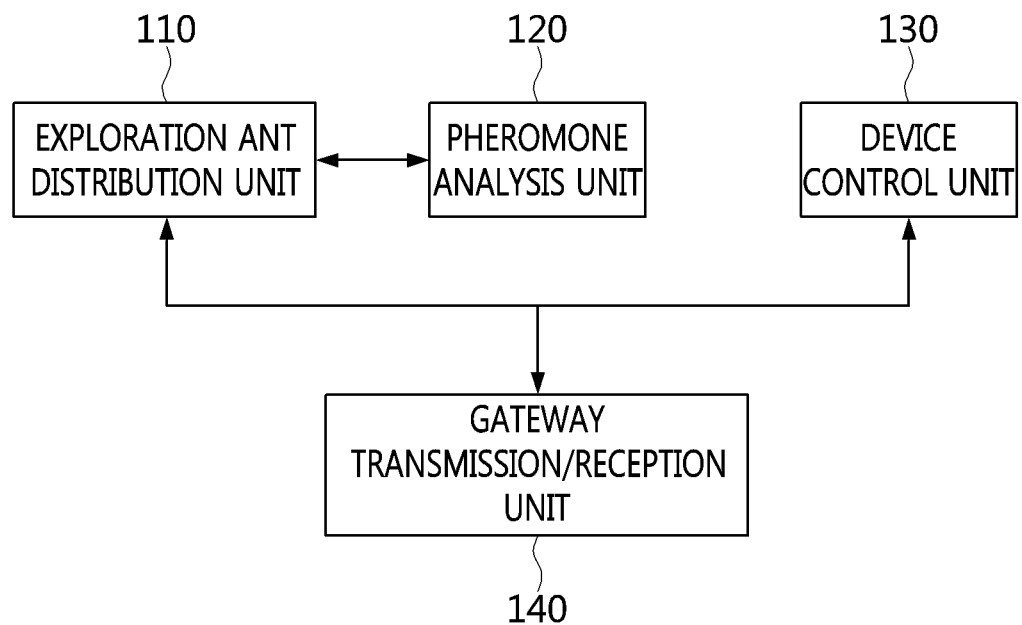
FIG. 9 is a block diagram illustrating a malicious device detection apparatus according to an embodiment of the present invention.

FIG. 9 is a block diagram illustrating a malicious device detection apparatus according to an embodiment of the present invention.

The malicious device detection apparatus 100 according to the embodiment of the present invention includes an exploration ant distribution unit 110, a pheromone analysis unit 120, a device control unit 130, and a gateway transmission/reception unit 140.

The exploration ant distribution unit 110 causes one or more exploration ants, generated in response to a detection request received from the security management server 10, to access a device swarm along a preset movement route, and is then capable of performing detection of a malicious device.

Here, the one or more exploration ants may request a status check from the devices of the device swarm 30, and may acquire detection information.

The exploration ant distribution unit 110 may receive a detection request including principal request items from the security management server 10, may select the type of exploration ant matching a function required in the detection request, and may then generate the one or more exploration ants.

Here, the exploration ant distribution unit 110 may continue or discontinue the operation of generating and allocating exploration ants by delivering a search command, which contains information about system items to be checked, the total number of exploration ants to be distributed, a distribution method for exploration ants, Time-to-Live (TTL) values of the exploration ants, and detection stop conditions, to the device swarm 30 in response to the detection request.

That is, the exploration ant distribution unit 110 may generate exploration ants and detect a malicious device until at least one of a search time during which the detection of a malicious device is performed, the number of exploration ants that are generated, and the number of suspicious devices that are discovered satisfies preset detection stop conditions.

Here, the types of exploration ants may be classified for respective pheromone update weights that are determined according to the system check function and the check purpose for the devices in the device swarm.

The following Table 1 shows a role model for system check functions, the check purposes, and the pheromone update weights for respective types of exploration ants in a swarm intelligence-based malicious device detection technique according to an embodiment of the present invention.

TABLE 1

| Exploration ant type | System check function | Check purpose | Pheromone update weight |
|---|---|---|---|
| Ant Type 1 | Monitoring of factory reset status | Check whether account and password are present<br>Check whether account and password defaults are present | a |
| Ant Type 2 | System process list | Check forced interruption of system process<br>Check unknown process<br>Check zombie process | b |
| Ant Type 3 | Processor share | Check excessive occupation of process by specific thread | c |
| Ant Type 4 | Occurrence of overflow | Check whether stack overflow occurs | d |
| Ant Type 5 | Battery usage rate | Check abnormal, excessive consumption of battery | e |

TABLE 1-continued

| Exploration ant type | System check function | Check purpose | Pheromone update weight |
|---|---|---|---|
| Ant Type 6 | Monitoring of network connection status | Check whether unauthorized communication with external entity located outside device swarm occurs | f |
| Ant Type 7 | Monitoring of network connection status | Check whether stored start and end address patterns of Return/Jump/Branch instructions are abnormal | g |
| . | . | . | . |
| . | . | . | . |
| . | . | . | . |
| Ant Type Z | Code memory management status | Check old version of OS/Firmware Check whether factory reset of device has occurred | z |

Here, the exploration ant distribution unit 110 may detect a malicious device 50 by allocating at least one of one or more exploration ants, generated for respective types of exploration ants, to the device swarm 30.

The exploration ant distribution unit 110 may directly transmit/receive data to/from the security management server 10 and the device swarm 30.

The exploration ant distribution unit 110 may randomly select a device (first-visit device) to be visited first by the corresponding exploration ant.

The exploration ant distribution unit 110 may incorporate the number of times the corresponding device is selected as the first-visit device into a pheromone trail value.

That is, the exploration ant distribution unit 110 may increase a pheromone trail value for a route to the device that is frequently selected as the first-visit device.

Further, the exploration ant distribution unit 110 may decrease a pheromone trail value for a route to the device that is unselected as the first-visit device.

When at least one exploration ant detects a suspicious device that is suspected to be a malicious device, the pheromone analysis unit 120 causes the exploration ant to return along the movement routes in reverse order, and is capable of generating a local information set by aggregating pheromone trail values collected from the devices on the return movement route.

When terminating route searching and returning to the malicious device detection apparatus 100, the exploration ant may deliver route selection probabilities for all routes traveled so far and updated pheromone trail values for respective movement routes to the exploration ant distribution unit 110.

Here, the exploration ant distribution unit 110 may deliver the pheromone trail values for respective movement routes to the pheromone analysis unit 120.

The pheromone analysis unit 120 may generate a local information set 15 using the pheromone trail values for respective movement routes, aggregated by the exploration ant from the devices in the device swarm 30, and the route selection probability information.

The device control unit 130 may receive detection information from the security management server 10 and identify a suspicious device 50 detected in the device swarm 30.

Here, the device control unit 130 may perform network isolation for blocking communication with the identified malicious device 50 in the device swarm 30, and may perform a memory integrity check on the malicious device 50.

The device control unit 130 may receive a network isolation command from the security management server 10 and transmit the result of execution of the isolation command to the security management server 10.

For example, the device control unit 130 may perform a function of broadcasting a command for prohibiting direct communication (device-to-device communication) with all devices suspected to be malicious devices in the device swarm 30 covered by the malicious device detection apparatus 100, or a function of changing the external connection status of a specific suspicious device from "permitted" to "denied" in a device routing table managed by the malicious device detection apparatus 100.

Here, when the result of the memory integrity check on the malicious device 50 indicates "abnormal", the device control unit 130 may update at least one of the OS and the firmware of the malicious device 50.

Conversely, when the result of the memory integrity check on the malicious device 50 indicates "normal", the device control unit 130 may execute a security patch command for the malicious device 50.

Here, the device control unit 130 may directly transmit/receive data to/from the security management server 10 and the device swarm 30.

The gateway transmission/reception unit 140 may perform network communication with the security management server 10 and the devices of the device swarm 30.

Figure 10:
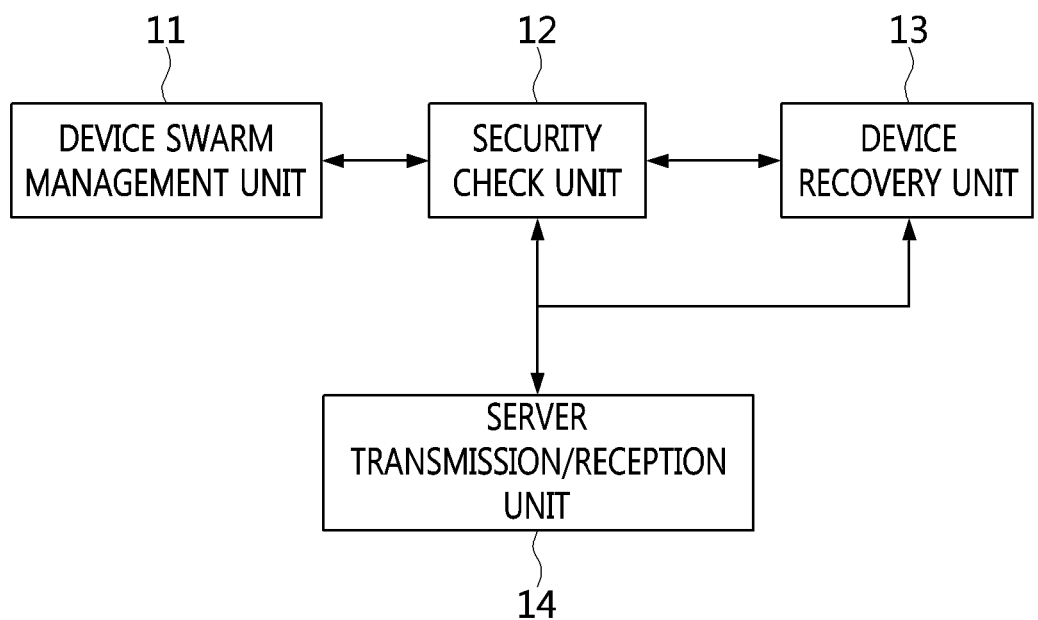
FIG. 10 is a block diagram illustrating a security management server according to an embodiment of the present invention.

FIG. 10 is a block diagram illustrating the security management server according to an embodiment of the present invention.

Referring to FIG. 10, the security management server 10 according to the embodiment of the present invention includes a device swarm management unit 11, a security check unit 12, a device recovery unit 13, and a server transmission/reception unit 14.

The device swarm management unit 11 may perform a function of storing and updating information about all device swarms managed by the security management server 10.

Here, the device swarm management unit 11 may store information about the malicious device detection apparatus 100, which manages the device swarm 30, and devices registered in the device swarm 30.

The security check unit 12 may acquire information about the malicious device detection apparatus 100, which manages the device swarm, from the device swarm management unit 11.

Here, the security check unit 12 may transmit a command for searching the device swarm 30 for an optimal solution (the most suspicious device) to the malicious device detection apparatus 100.

The security check unit 12 may also transmit the command for searching the device swarm 30 for an optimal solution to the malicious device detection apparatus 100 through the server transmission/reception unit 14.

The security check unit 12 may select an optimal solution from the local information set 15 received from the malicious device detection apparatus 100.

Here, the security check unit 12 may select an optimal solution from the local information set 15 received from the malicious device detection apparatus 100 through the server transmission/reception unit 14.

The security check unit 12 may select a global solution from the local information set 15.

The device recovery unit 13 may transmit a recovery command for the malicious device 50, which is the optimal solution, to the malicious device detection apparatus 100, based on the global solution selected by the security check unit 12.

In this case, the device recovery unit 13 may also transmit a recovery command for the malicious device 50, which is the optimal solution, to the malicious device detection apparatus 100 through the server transmission/reception unit 14, based on the global solution selected by the security check unit 12.

For example, the recovery command may correspond to a command for "isolation of a specific device from the network", "forced update of OS or firmware of the specific device", or "memory integrity check for the specific device". The command for device recovery is not limited to the above-described example, but may be easily, scalably designed and applied based on the business model of a service provider, the purpose of service, and the policy of a security management server manager.

Further, the device recovery unit 13 may determine whether a memory integrity measurement value for the malicious device 50, received from the malicious device detection apparatus 100, is true or false.

The server transmission/reception unit 14 may perform a function of network communication with the malicious device detection apparatus 100 using software, hardware, or a combination of software and hardware.

Figure 11:
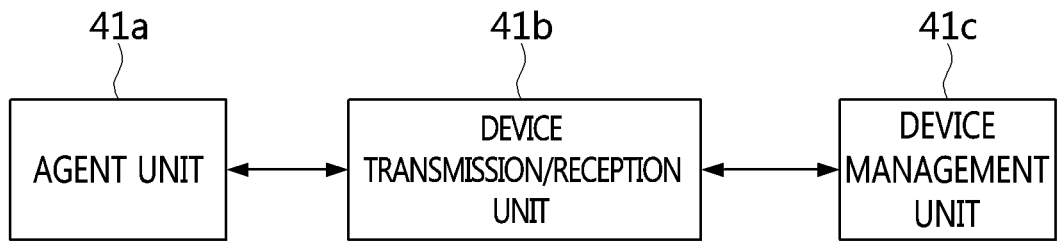
FIG. 11 is a block diagram illustrating an agent device according to an embodiment of the present invention.

FIG. 11 is a block diagram illustrating an agent device according to an embodiment of the present invention.

Referring to FIG. 11, an agent device 41 according to an embodiment of the present invention may be any of individual devices 41 to 49 included in the above-described device swarm 30.

Here, the agent device 41 includes an agent unit 41a, a device transmission/reception unit 41b, and a device management unit 41c.

The agent unit 41a may perform the operation of performing a check for a specific system item, required by an exploration ant that visits the corresponding device, and of returning the result of the check.

Here, when the device is a start node i in route (i, j), the agent unit 41a may perform pheromone update on route (i, j). The pheromone update may occur during the procedure in which the exploration ant discovers a system abnormality in a specific device and returns to the malicious device detection apparatus 100 in reverse order with respect to movement routes.

Here, "pheromone adjustment" may encompass two meanings, that is, the update (increase) of a pheromone trail value and the evaporation (decrease) of a pheromone trail value.

The agent unit 41 may add a pheromone value $\Delta\gamma_{i,j}$ corresponding to a specific amount to route (i, j) when the exploration ant, having passed through route (i, j), discovers a device having a system abnormality while decreasing a pheromone trail value $\gamma_{i,j}$ for route (i, j) over time at an evaporation rate of $\theta$, as given in the following Equation (1).

That is, a pheromone trail value for a movement route that is unselected by the exploration ant may be reduced over time at the evaporation rate.

Further, as the exploration ant returns, pheromone trail values for return movement routes may be increased.

Here, the agent unit 41 may generate a pheromone trail value in consideration of a pheromone update weight for the exploration ant.

$$\gamma_{i,j}=(1-\theta)\gamma_{i,j}+\Delta\gamma_{i,j} \quad (1)$$

In Equation (1), $\theta$ may denote the evaporation rate of the pheromone trail value, and $\Delta\gamma_{i,j}$ may denote the amount of update of the pheromone trail value.

Here, in accordance with an embodiment of the present invention, it may be assumed that in Equation (1), $\Delta\gamma_{i,j}$ is in inverse proportion to the cost paid by the specific exploration ant to move along the route (i, j).

Here, $\Delta\gamma_{i,j}$ may be generated using a pheromone update weight determined according to the type of exploration ant.

The pheromone update weights generated for the types of exploration ants may contribute to decreasing the paid cost. Therefore, the pheromone trail value may be increased at a higher rate as a more serious system security vulnerability (i.e. having a higher pheromone update weight) is discovered.

Here, when the exploration ant visits the device i, the agent unit 41a may calculate route selection probabilities for routes (i, j) to all nodes j selectable by node i when selecting the next device j, as given in the following Equation (2). In this case, the probability that a route having a higher value of $\gamma_{i,j}$ will be selected may be increased using pheromone trail values previously present on the route (i, j). Further, the shorter the length (distance) of the route, the higher the probability that the route will be selected. Equation (2) is not limited to the above-described two elements, but elements other than the distance may be additionally applied to Equation (2).

$$P_{i,j} = \frac{\gamma_{i,j}^{\alpha}\mu_{i,j}^{\beta}}{\sum \gamma_{i,j}^{\alpha}\mu_{i,j}^{\beta}} \quad (2)$$

In Equation (2), $\gamma_{i,j}$ may denote a pheromone trail value left on route (i, j), $\alpha$ may denote a control parameter for $\gamma_{i,j}$, $\mu_{i,j}$ may denote a preference value for route (i, j), and $\beta$ may denote a control parameter for $\mu_{i,j}$.

In particular, in accordance with an embodiment of the present invention, the preference value $\mu_{i,j}$ on the route (i, j) in Equation (2) may be typically assumed to be in inverse proportion to the length of the corresponding route.

Furthermore, in the case of the route selection probability information, when a pheromone trail value is not present on a selectable movement route, the total route selection probability may be equally divided by the number of selectable movement routes, and then route selection probabilities for respective movement routes may be set.

For example, the route selection probability information may be equally divided and set such that, when there are movement routes to device 3 43 and to device 5 45, and pheromone trail values are not present for respective devices, the probability that the movement route to device 3 43 will be selected may be set to 50% and the probability that the movement route to device 5 45 will be selected may be set to 50%.

Here, when exploration ant A moves to device y from device x, the agent unit 41a of the device y may confirm the visit of the exploration ant A, and may process various requests, such as a system check request, a request to store a system check result, a request to select a network route, a pheromone update request, a request to store an updated pheromone trail value, and a route storage request, which are made by the exploration ant A.

More detail, when a storage-related request is present among the requests, the agent unit 41a may also perform a function of updating the status information of the exploration ant A. Meanwhile, when a processing-related request is present among the requests, the agent unit 41a may execute the processing-related request.

The device transmission/reception unit 41b may perform data communication with the malicious device detection apparatus 100.

The device management unit 41c may receive a memory integrity verification command from the malicious device detection apparatus 100, generate a memory integrity measurement value, and deliver the measurement value to the security management server 10 through the malicious device detection apparatus 100.

Here, the device management unit 41c may receive a forced OS/firmware update request or a forced security patch request from the security management server 10, and may process the received request.

Figure 12:
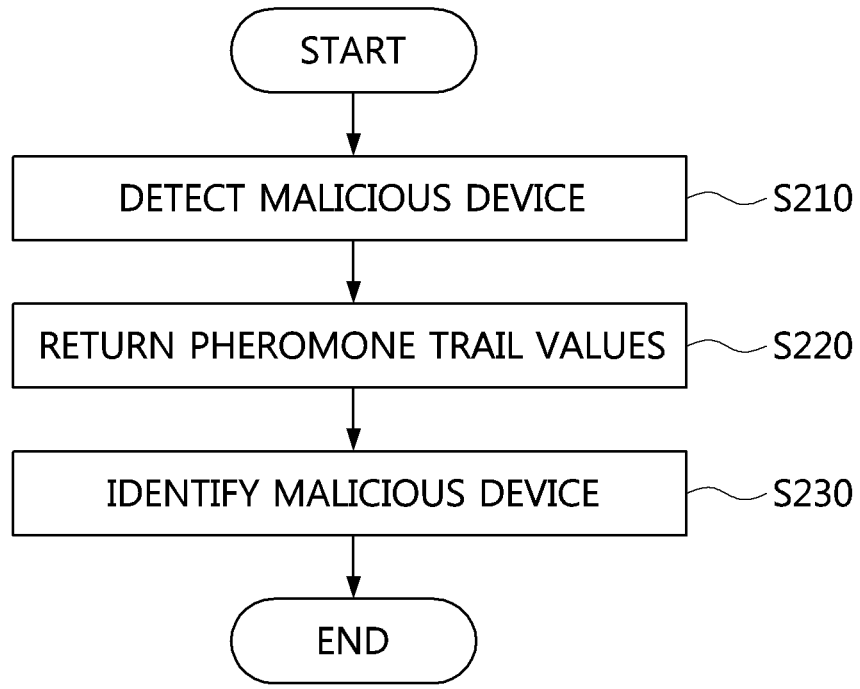
FIG. 12 is a flowchart illustrating a malicious device detection method according to an embodiment of the present invention.
Figure 13:
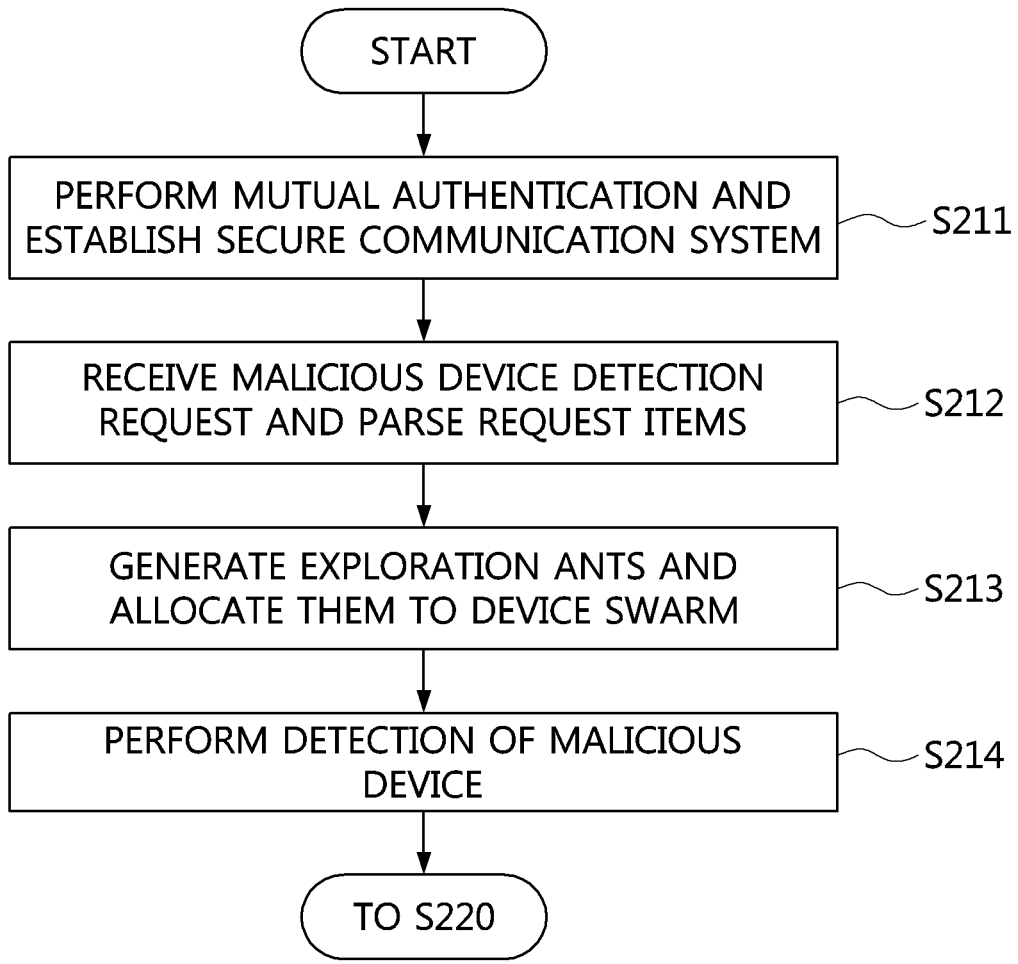
FIG. 13 is an operation flowchart illustrating in detail an example of the malicious device detection step illustrated in FIG. 12.
Figure 14:
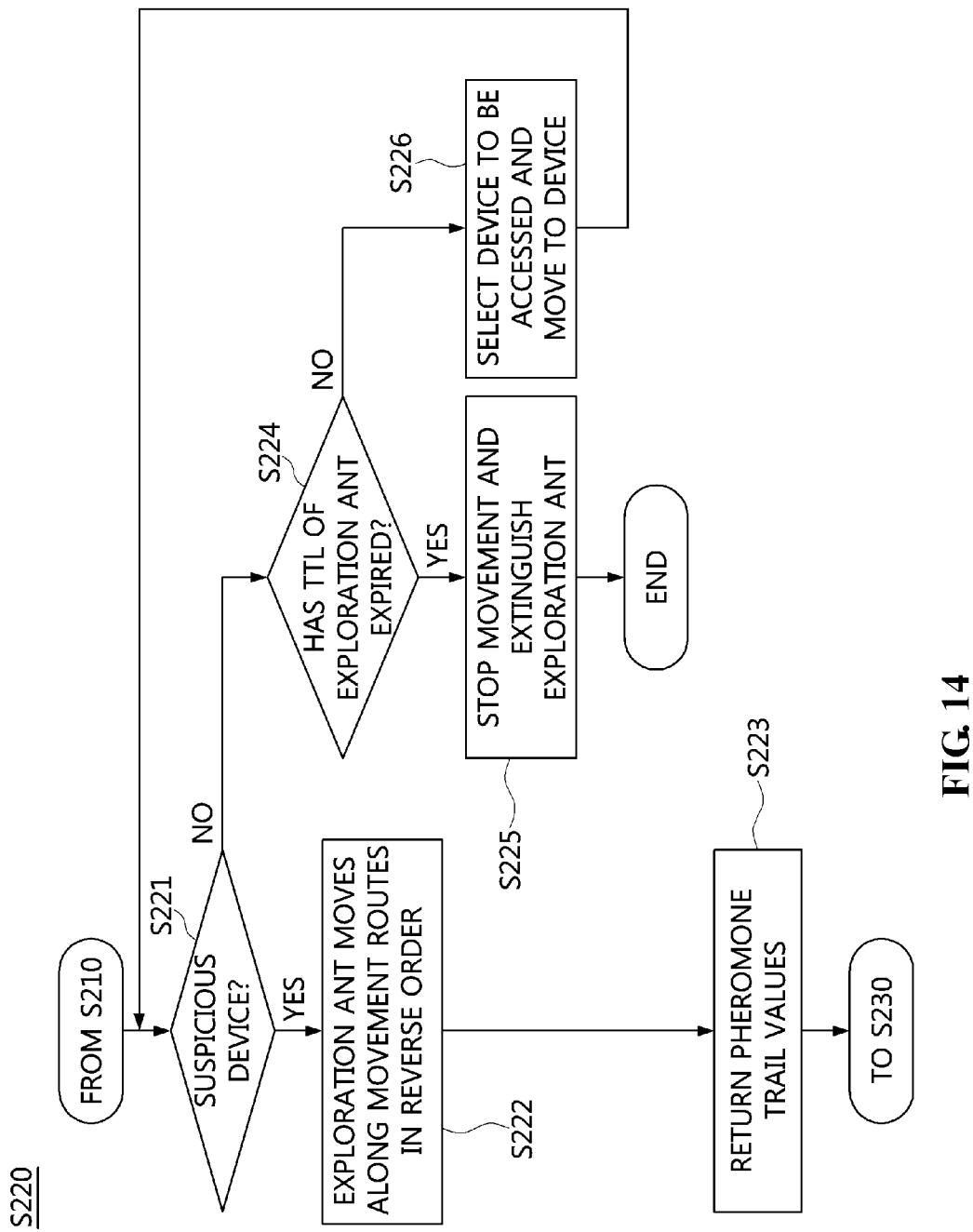
FIG. 14 is an operation flowchart illustrating in detail an example of the pheromone trail value return step illustrated in FIG. 12.
Figure 15:
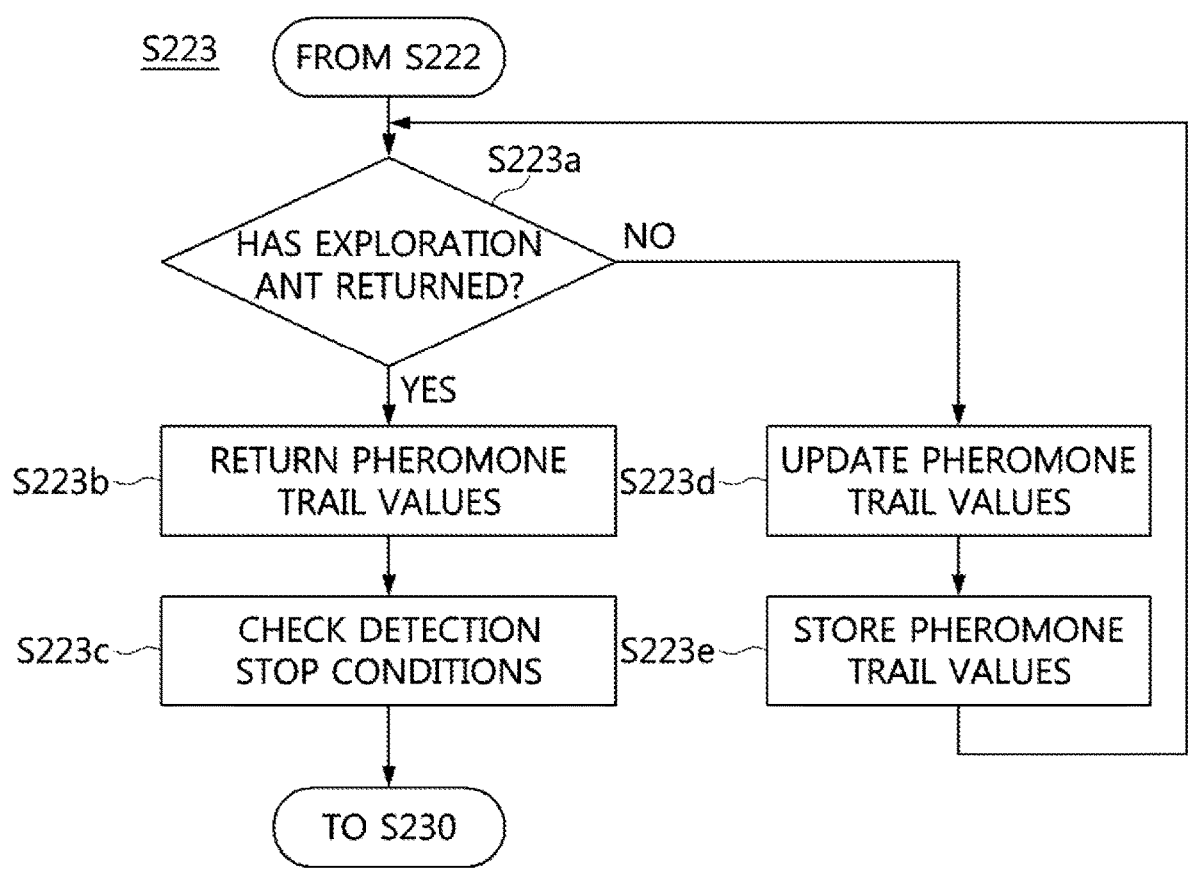
FIG. 15 is an operation flowchart illustrating in detail an example of the pheromone trail value return step illustrated in FIG. 14.
Figure 16:
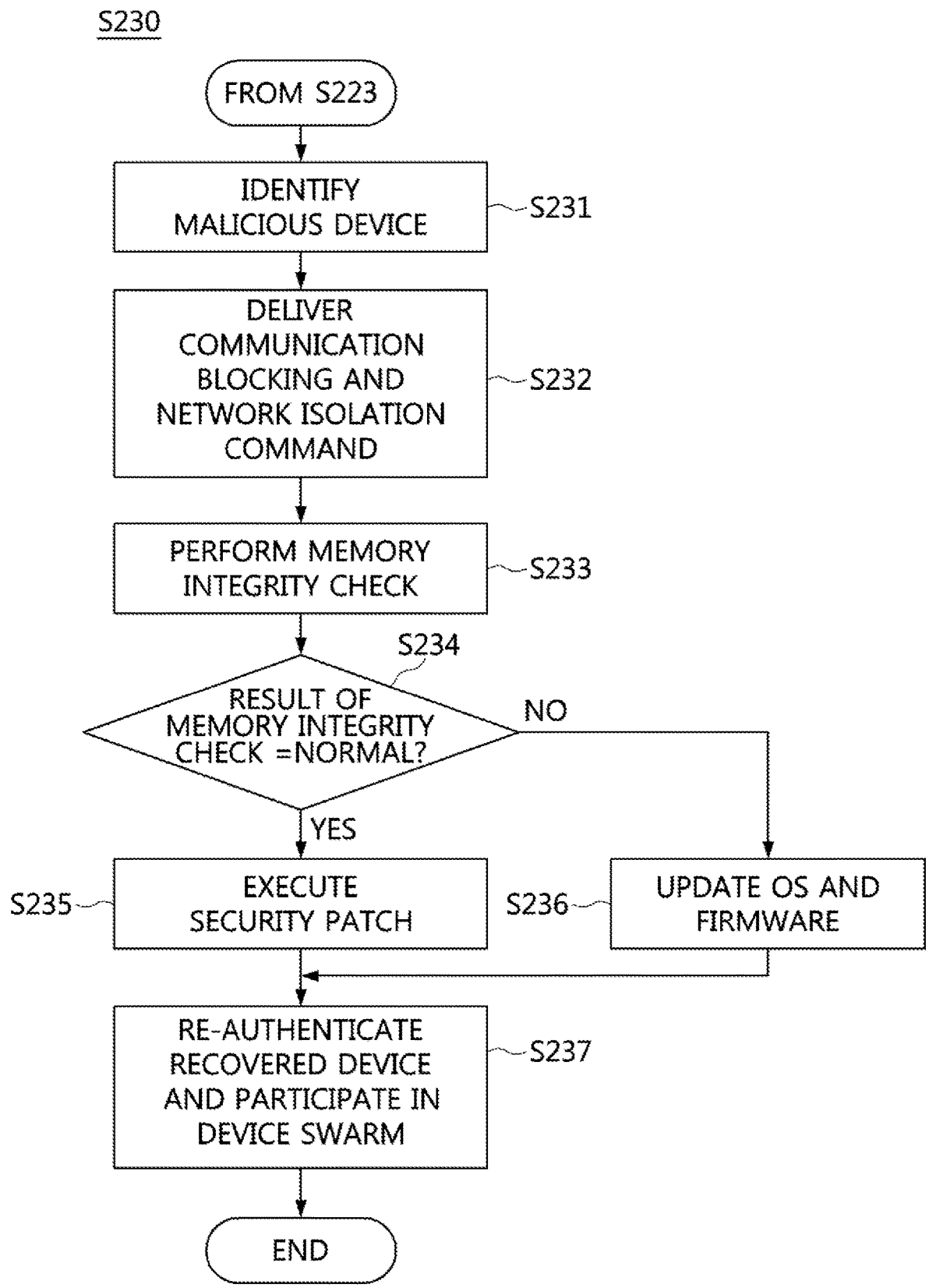
FIG. 16 is an operation flowchart illustrating in detail an example of the malicious device identification step illustrated in FIG. 12.

FIG. 12 is a flowchart illustrating a malicious device detection method according to an embodiment of the present invention. FIG. 13 is an operation flowchart illustrating in detail an example of the malicious device detection step illustrated in FIG. 12. FIG. 14 is an operation flowchart illustrating in detail an example of the pheromone trail value return step illustrated in FIG. 12. FIG. 15 is an operation flowchart illustrating in detail an example of the pheromone trail value return step illustrated in FIG. 14. FIG. 16 is an operation flowchart illustrating in detail an example of the malicious device identification step illustrated in FIG. 12.

Referring to FIG. 12, the malicious device detection method according to the embodiment of the present invention may detect a malicious device at step S210.

That is, at step S210, the detection of a malicious device 50 may be performed by causing at least one exploration ant, generated in response to a detection request from the security management server 10, to access the device swarm 30 along movement routes in which pheromone trail values are taken into consideration.

Referring to FIG. 13, in a procedure at step S210, mutual authentication may be performed and a secure communication system may be established at step S211.

That is, at step S211, a mutual authentication and encrypted communication session may be established between the security management server 10, the malicious device detection apparatus 100, the user terminal device 20, and the device swarm 30.

Here, step S211 may be performed when a new device is initially arranged in the device swarm 30 and requests registration and authentication from the security management server 10.

Further, step S211 may also be performed when a secret network communication session between entities is established.

Next, in the procedure at step S210, a malicious device detection request may be received and a request item may be parsed at step S212.

That is, at step S212, a suspicious device detection request may be received from the security management server 10. Here, a rule by which a suspicious device detection request event occurs may be prescribed by the manager of the security management server 10, the service operator of the device swarm 30, or the policy of a service provider for the corresponding network system.

At step S212, principal request items, such as system items to be checked, the total number of exploration ants to be distributed, the distribution method for exploration ants, Time-to-Live (TTL) values of the exploration ants, and detection stop conditions, may be parsed and extracted from the suspicious device detection request.

Further, in the procedure at step S210, the generation of exploration ants and the allocation of the exploration ants to the device swarm may be performed at step S213.

That is, step S213 is configured to generate a requested number of exploration ants, which will check specific system items required by the security management server 10, based on the principal request items extracted from the detection request. System check items to be performed for respective exploration ants are described in detail in the above Table 1.

Here, at step S213, at least one of the one or more exploration ants generated for respective exploration ant types may be allocated to the device swarm.

At step S213, the generated exploration ants may be distributed to random devices of the device swarm 30, either sequentially or in parallel, depending on the requested method.

That is, at step S213, a device (first-visit device) to be visited first by the exploration ant may be randomly selected.

In detail, at step S213, the number of times the corresponding device is selected as the first-visit device may be incorporated into a pheromone trail value.

At step S213, a pheromone trail value for a route to a device that is frequently selected as the first-visit device may be increased.

At step S213, a pheromone trail value for a route to a device that is unselected as the first-visit device may be decreased.

Further, in the procedure at step S210, the detection of a malicious device may be performed at step S214.

That is, at step S214, the at least one exploration ant may request a status check from each device of the device swarm 30 to be accessed, and may acquire detection information therefrom.

At step S214, the exploration ant may be distributed to any device of the device swarm 30, the distributed exploration ant may be parsed in the device, and the device may deliver the result of the check performed for specific system items requested by the exploration ant based on the parsed content to the exploration ant.

At step S214, it is possible to request a status check from the device of the device swarm 30 accessed by the at least one exploration ant to acquire detection information.

At step S214, a pheromone trail value for each movement route may be generated using a pheromone update weight determined according to the type of exploration ant.

In this case, at step S214, the pheromone trail value may be generated using the above Equation (1).

Here, at step S214, the exploration ant may primarily select the movement route having a higher pheromone trail value.

Here, at step S214, the exploration ant may stochastically select a movement route using route selection probability information in which route selection probabilities are in proportion to the pheromone trail values.

The route selection probability information may be calculated using the above Equation (2).

The route selection probability information is set such that route selection probabilities are in inverse proportion to the lengths of movement routes.

Here, when a pheromone trail value is not present on movement routes selectable by the exploration ant, the route selection probability information may be set such that the total route selection probability is equally divided by the number of selectable movement routes into route selection probabilities for respective movement routes.

In this case, at step S214, pheromone trail values for movement routes, unselected by the exploration ant, may be decreased over time at an evaporation rate.

Next, the malicious device detection method according to the embodiment of the present invention may return pheromone trail values at step S220.

That is, at step S220, when the at least one exploration ant detects a suspicious device, which is suspected to be a malicious device 50, the exploration ant may return along the movement routes in reverse order, and may return pheromone trail values generated by the devices on the return movement routes to the malicious device detection apparatus 100.

Referring to FIG. 14, in a procedure at step S220, the exploration ant may visit the corresponding device, and may determine whether the device is a suspicious device at step S221.

In detail, if it is determined at step S221 that the result of the device check indicates a suspicious device, the exploration ant may return along return movement routes in reverse order with respect to the movement routes at step S222, whereas if it is determined that the result of the device check indicates a normal device, the TTL value of the exploration ant may be checked at step S224.

At step S222, pheromone trail values may be generated while the exploration ant is moving to each device in reverse order with respect to the movement routes, and the exploration ant may then return to the malicious device detection apparatus 100.

Here, at step S222, the exploration ant may return while moving along the movement routes in reverse order, and may increase the pheromone trail values for the return movement routes.

In the procedure at step 220, the pheromone trail values may be returned by aggregating pheromone trail values generated by devices on the movement routes along which the returned exploration ant has moved at step S223.

Referring to FIG. 15, in a procedure at step S223, whether the exploration ant has returned may be checked at step S223a.

As a result of checking at step S223a, when the exploration ant is found to have returned to the malicious device detection apparatus 100, the pheromone trail values may be returned at step S223b, whereas when the exploration ant is found not to have returned to the malicious device detection apparatus 100, the device from which the exploration ant is returning may recognize that the exploration ant is returning, and the pheromone trail value that is currently being aggregated by the exploration ant may be updated at step S223d.

Here, at step S223b, whether the device from which the exploration ant has returned is the malicious device detection apparatus 100 may be queried.

At step S223b, when an answer to the query indicates the malicious device detection apparatus 100, the pheromone trail values aggregated from the devices on the movement routes may be returned.

At step S223b, the aggregated pheromone trail values for the movement routes may be returned to the malicious device detection apparatus 100.

Further, in the procedure at step S223, detection stop conditions may be checked at step S223c.

Here, at step S223c, the exploration ant may be generated to detect a malicious device until at least one of a time during which the detection of the malicious device 50 is performed, the number of exploration ants that are generated, and the number of suspicious devices that are discovered satisfies preset detection stop conditions.

Also, at step S223d, the pheromone trail values may be updated.

That is, at step S223d, when the exploration ant returns in reverse order with respect to route (i, j) along which it has moved, if the exploration ant returns to device i, the device i may recognize that the exploration ant is returning, and may request the update (increase) of the pheromone trail value for route (i, j). In this case, the device may evaporate (or decrease) the existing pheromone trail value for route (i, j) using Equation (1), or may update (or increase) the pheromone trail value using Equation (1).

Also, in the procedure at step S223, the pheromone trail values may be stored at step S223e.

That is, at step S223e, the exploration ant may receive a pheromone trail value from the device, and may store therein the value in the format of data.

Here, at step S223e, the exploration ant may select a movement route and may then move to the next destination, and whether the exploration ant has returned to the malicious device detection apparatus 100 may be checked at step S223a.

Referring back to FIG. 14, in the procedure at step S220, when the result of the device check indicates a normal device, the TTL value of the exploration ant may be checked at step S224.

At step S224, when the TTL value of the exploration ant is checked and the TTL value is 0, the movement of the exploration ant may be stopped and the exploration ant may be extinguished because the TTL has expired at step S225. Conversely, when the TTL value is 1 or more, a device to be accessed may be selected, and then the exploration ant may be moved to the device at step S226.

At step S225, when the TTL value is 0, the exploration ant does not perform a route search any further. Accordingly, the device that the exploration ant having a TTL value of 0 visited may stop processing the requests made by the exploration ant, extinguish the exploration ant, and terminate the corresponding procedure.

Further, at step S226, when the value of TTL is 1 or more, the exploration ant may continue to perform the route search procedure using the route selection probabilities obtained in Equation (2) based on pheromone trail values for routes. In this case, at step S226, the device which the exploration ant visits calculates the route selection probability of Equation (2), and then allows the exploration ant to select a movement route.

In this case, in the procedure at step S226, the movement route may be selected based on pheromone trail values, and the at least one exploration ant may move to the selected next device and may determine whether the device is a suspicious device at step S221.

At step S226, a movement route having a high pheromone trail value may be primarily selected.

At step S226, the exploration ant may stochastically select the movement route using route selection probability information in which route selection probabilities are in proportion to the pheromone trail values.

Further, the malicious device detection method according to the embodiment of the present invention may identify a malicious device at step S230.

That is, at step S230, an optimal solution based on a local information set, generated by aggregating pheromone trail values returned for respective movement routes, may be calculated, and then whether the suspicious device is a malicious device 50 may be identified.

Referring to FIG. 16, in a procedure at step S230, a malicious device may be identified at step S231.

That is, at step S231, the final device, which the exploration ant will meet when an optimal solution is calculated from the generated local information set 15 and the exploration ant moves along the movement route into which the highest pheromone trail value is incorporated, may be identified as a malicious device.

At step S231, the local information set 15 aggregated so far (route selection probability information and pheromone trail values for respective movement routes) may be inquired about.

At step S231, the local information set 15 may be delivered to the security management server 10, and then the optimal solution may be calculated.

At step S231, when a plurality of suspicious devices are selected, the optimal solution of the local information set 15 may be calculated to identify a malicious device.

At step S231, as a result of calculation of the optimal solution, the device having the most serious fault in system security may be selected as a global optimal solution. In accordance with an embodiment of the present invention, a description has been made on the assumption that the global solution is a single device. However, it is also possible to select a plurality of suspicious devices which have serious faults in system security and to calculate the global solution as a plurality of malicious devices based on the policy of the security management server 10.

Further, in a procedure at step S230, a communication blocking and network isolation command may be executed at step S232.

At step S232, the network isolation and communication blocking command may be executed on the device selected as the global optimal solution.

Here, at step S232, the security management server 10 may deliver the network isolation and communication blocking command to the device swarm 30 through the malicious device detection apparatus 100.

At step S232, a command for prohibiting device-to-device communication with the malicious device 50 may be delivered to all devices in the device swarm 30, except the malicious device 50 corresponding to the global optimal solution.

Further, at step S232, the malicious device detection apparatus 100 may request the device swarm 30 to prohibit the malicious device 50 from performing external connection communication.

In the procedure at step S230, a memory integrity check may be performed at step S233.

In detail, at step S233, a memory integrity check command may be executed on the device selected as the global optimal solution.

At step S233, the security management server 10 may deliver the memory integrity check command to the device swarm 30 through the malicious device detection apparatus 100.

In the procedure at step S230, the result of the memory integrity check may be verified at step S234.

In detail, at step S234, the result of the memory integrity check (i.e. a memory integrity measurement value) may be received from the device swarm 30.

Here, at step S234, whether the corresponding device is normal or abnormal may be determined by comparing the received memory integrity measurement value with a memory integrity value calculated by the security management server 10.

At step S234, if the memory integrity measurement value is identical to the calculated result value, the corresponding device is determined to be normal, whereas if the memory integrity measurement value is different from the calculated result value, the corresponding device is determined to be abnormal.

In detail, if it is determined at step S234 that the result of the memory integrity check indicates normality, a security patch may be executed at step S235, whereas if it is determined at step S234 that the result of the memory integrity check indicates abnormality, the OS and firmware of the corresponding device may be updated at step S236.

At step S235, the security patch of the malicious device 50 may be forcibly executed.

At step S236, the OS and firmware of the malicious device 50 may be forcibly updated.

Next, in the procedure at step S230, the re-authentication of a recovered device and participation of the recovered device in the device swarm 30 may be performed at step S237.

In detail, at step S237, the recovered device may request re-authentication from the security management server 10, and may then attempt to participate in the device swarm 30 normally.

Figure 17:
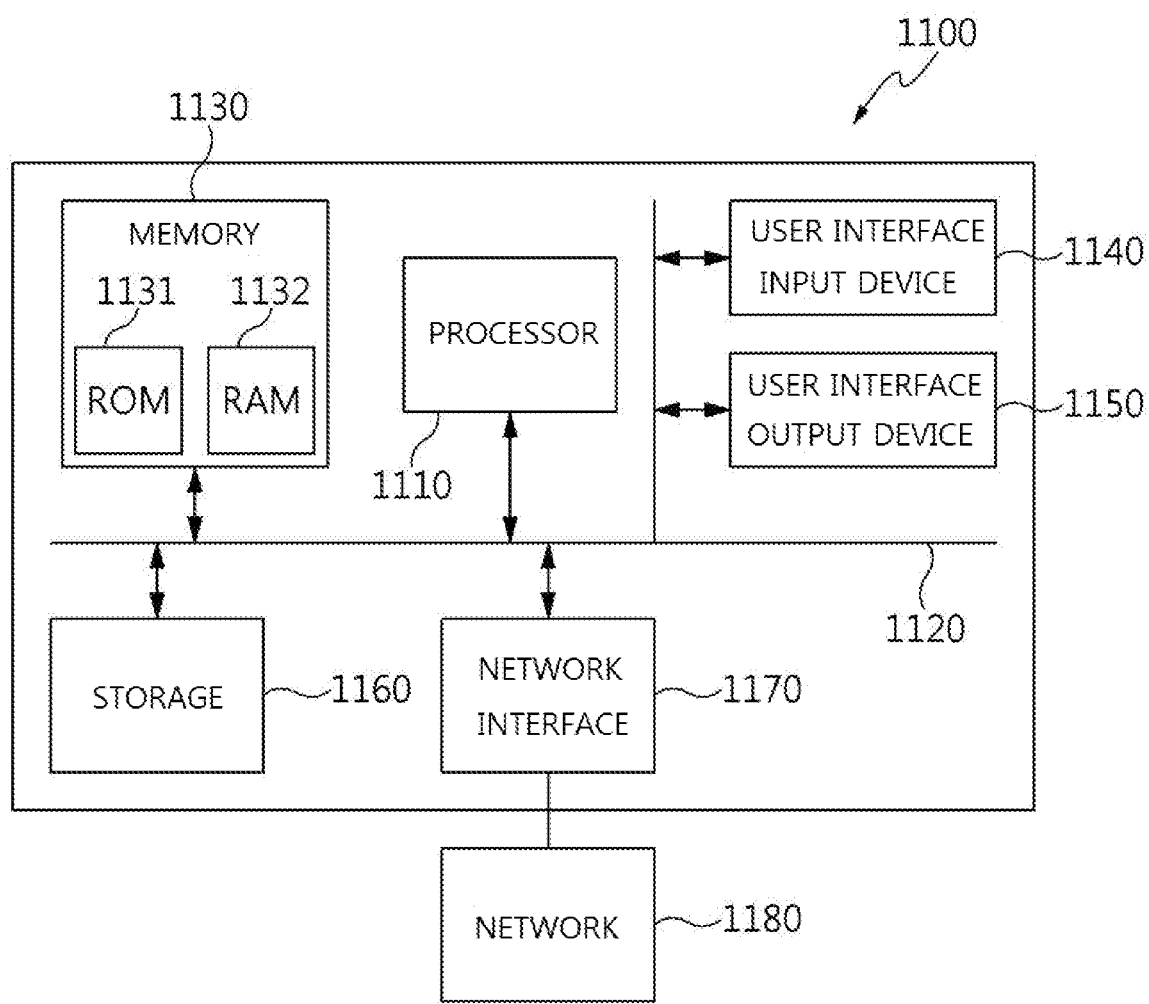
FIG. 17 is a block diagram illustrating a computer system according to an embodiment of the present invention.

FIG. 17 is a block diagram illustrating a computer system according to an embodiment of the present invention.

Referring to FIG. 17, the embodiment of the present invention may be implemented in a computer system 1100 such as a computer-readable storage medium. As illustrated in FIG. 17, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

That is, each of the malicious device detection apparatus 100, the security management server 10, the user terminal device 20, and the individual devices 41 to 49 according to the embodiments of the present invention may be implemented as the computer system 1100.

The configurations and embodiments of the present invention are not limited to the above descriptions, and may provide technical flexibility that enables wireless, personal or mobile devices to be extended and modified suitably for a typical application service environment.

As described above, the present invention may overcome the limitation of a conventional device security evaluation technique that determines only whether a device is normal or damaged.

Further, the present invention may greatly reduce overhead caused by the generation of global information, updating, and management.

Furthermore, the present invention may make a similar optimal solution decision very close to a global solution decision that can be made when global information is acquired.

Furthermore, the present invention may effectively search devices falling within a very wide range for a malicious device by making relatively little effort, unlike a conventional technique.

Furthermore, the present invention may provide a structural advantage by distributing decision-making structures when searching for a malicious device.

As described above, in the apparatus and method for detecting a malicious device based on swarm intelligence according to the present invention, the configurations and schemes in the above-described embodiments are not limitedly applied, and some or all of the above embodiments can be selectively combined and configured such that various modifications are possible.

What is claimed is:

1. A method for detecting a malicious device based on swarm intelligence, the method being performed using an apparatus for detecting a malicious device based on swarm intelligence, the method comprising:
    detecting a malicious device by causing at least one exploration ant to access a device swarm along movement routes in which pheromone trail values are taken into consideration, wherein the at least one exploration ant is generated in response to a detection request received from a security management server;
    when the at least one exploration ant detects a suspicious device that is suspected to be a malicious device, causing the exploration ant to return along the movement routes in reverse order, and returning pheromone trail values generated by devices on the return movement routes to the malicious device detection apparatus; and
    identifying whether the suspicious device is the malicious device by calculating an optimal solution based on a local information set that is generated by aggregating the pheromone trail values returned for respective movement routes,
    wherein detecting the malicious device is configured to generate pheromone trail values for the movement routes using the pheromone update weights determined depending on the types of the exploration ants.

2. The method of claim 1, wherein detecting the malicious device is configured to request a status check from each device in the device swarm accessed by the at least one exploration ant and acquire detection information from the device.

3. The method of claim 2, wherein detecting the malicious device is configured to detect the malicious device by allocating at least one of one or more exploration ants, generated for respective types of exploration ants, to the device swarm.

4. The method of claim 3, wherein the types of exploration ants are classified for respective pheromone update weights that are determined depending on system check functions and check purposes of devices in the device swarm.

5. The method of claim 4, wherein detecting the malicious device is configured to allow the exploration ant to primarily select a movement route having a higher pheromone trail value.

6. The method of claim 5, wherein detecting the malicious device is configured to stochastically select movement routes using route selection probability information in which route selection probabilities are in proportion to the pheromone trail values.

7. The method of claim 6, wherein the route selection probability information is configured such that route selection probabilities are in inverse proportion to lengths of the movement routes.

8. The method of claim 7, wherein the route selection probability information is configured such that, when a pheromone trail value is not present for a movement route selectable by the exploration ant, a total route selection probability is equally divided by a number of selectable movement routes into route selection probabilities for respective movement routes.

9. The method of claim 8, wherein detecting the malicious device is configured to decrease a pheromone trail value for a movement route, unselected by the exploration ant, over time at a predetermined evaporation rate.

10. The method of claim 9, wherein returning the pheromone trail values is configured to cause the exploration ant to return along the movement routes in reverse order and to increase pheromone trail values for the return movement routes.

11. The method of claim 10, wherein returning the pheromone trail values is configured to generate the exploration ants and detect the malicious device until at least one of a search time during which the malicious device is detected, a number of exploration ants that are generated, and a number of suspicious devices that are discovered satisfies a preset detection stop condition.

12. The method of claim 11, wherein identifying whether the suspicious device is the malicious device is configured to perform network isolation of blocking communication with the malicious device and to perform a memory integrity check on the malicious device.

13. The method of claim 12, wherein identifying whether the suspicious device is the malicious device is configured to update at least one of an operating system and firmware of the malicious device when a result of the memory integrity check on the malicious device indicates abnormality.

14. The method of claim 13, wherein identifying whether the suspicious device is the malicious device is configured to execute a security patch command for the malicious device when a result of the memory integrity check on the malicious device indicates normality.

15. An apparatus for detecting a malicious device based on swarm intelligence, comprising:
    an exploration ant distribution unit for detecting a malicious device by causing at least one exploration ant to access a device swarm along movement routes in which pheromone trail values are taken into consideration, wherein the at least one exploration ant is generated in response to a detection request received from a security management server;
    a pheromone analysis unit for, when the at least one exploration ant detects a suspicious device that is suspected to be a malicious device, causing the exploration ant to return along the movement routes in reverse order, and generating a local information set by aggregating pheromone trail values collected from devices on the return movement routes; and
    a device control unit for identifying whether the suspicious device is the malicious device by calculating an optimal solution based on the local information set, wherein the exploration ant distribution unit generates pheromone trail values for the movement routes using pheromone update weights determined depending on types of exploration ants.

16. The apparatus of claim 15, wherein the exploration ant stochastically selects the movement route using route selection probability information in which route selection probabilities are in proportion to the pheromone trail values.

17. The apparatus of claim 16, wherein the exploration ant distribution unit generates the exploration ants and then detects the malicious device until at least one of a search time during which the malicious device is detected, a number of exploration ants that are generated, and a number of suspicious devices that are discovered satisfies a preset detection stop condition.

18. The apparatus of claim 17, wherein the device control unit performs network isolation of blocking communication with the malicious device and performs a memory integrity check on the malicious device.

\* \* \* \* \*